(12) United States Patent
Penny et al.

(10) Patent No.: US 11,325,299 B2
(45) Date of Patent: May 10, 2022

(54) ADDITIVE MANUFACTURING VIA OPTICAL APERTURE DIVISION MULTIPLEXING

(71) Applicant: Massachusetts Institute of Technology, Cambridge, MA (US)

(72) Inventors: Ryan Wade Penny, Cambridge, MA (US); Anastasios John Hart, Waban, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 149 days.

(21) Appl. No.: 16/513,700

(22) Filed: Jul. 16, 2019

(65) Prior Publication Data

US 2020/0016820 A1 Jan. 16, 2020

Related U.S. Application Data

(60) Provisional application No. 62/698,738, filed on Jul. 16, 2018.

(51) Int. Cl.
*B29C 64/10* (2017.01)
*B29C 64/264* (2017.01)
(Continued)

(52) U.S. Cl.
CPC ............ *B29C 64/10* (2017.08); *B29C 64/141* (2017.08); *B29C 64/188* (2017.08);
(Continued)

(58) Field of Classification Search
CPC ... B29C 64/141; B29C 64/264; B29C 64/386; B29C 64/393; H04J 14/00
See application file for complete search history.

(56) References Cited

U.S. PATENT DOCUMENTS 5,004,311 A * 4/1991 Peppers ............ G02B 27/0031
  359/208.1
6,268,584 B1 7/2001 Keicher et al.
(Continued)

OTHER PUBLICATIONS

[No Author Listed] Thorlabs, "F-Theta Scan Lenses," https://www.thorlabs.us/newgrouppage9.cfm?objectgroup_id=6430 (4 pages).
(Continued)

*Primary Examiner* — Atul P. Khare
(74) *Attorney, Agent, or Firm* — Barnes & Thornburg LLP

(57) ABSTRACT

Systems, devices, and methods for additive manufacturing as disclosed allow for improved optical access to a build platform. In at least some embodiments a multiplexing optic of an additive manufacturing device is configured to multiplex an arbitrary number of optical paths to a build platform along a substantially common optical axis by dividing a theoretical input aperture of the multiplexing optic into a plurality of sub-apertures. Each sub-aperture can independently receive and direct an optical path to the build platform. An optical path can be a light path from a light source or an optical process monitoring path from an optical process monitoring system or optical process monitoring device. In some embodiments, an optical path can enter the multiplexing optic off-axis and/or off-angle with respect to an optical axis of the multiplexing optic. The multiplexing optic can include one or more lens elements and/or one or more mirror elements.

29 Claims, 9 Drawing Sheets

(51) Int. Cl.
*H04J 14/00* (2006.01)
*B29C 64/245* (2017.01)
*B29C 64/277* (2017.01)
*B29C 64/227* (2017.01)
*B29C 64/286* (2017.01)
*B29C 64/393* (2017.01)
*B29C 64/188* (2017.01)
*B29C 64/141* (2017.01)
*B33Y 50/02* (2015.01)
*B33Y 10/00* (2015.01)
*B33Y 30/00* (2015.01)
*B33Y 40/00* (2020.01)

(52) U.S. Cl.
CPC .......... *B29C 64/227* (2017.08); *B29C 64/245* (2017.08); *B29C 64/277* (2017.08); *B29C 64/286* (2017.08); *B29C 64/393* (2017.08); *H04J 14/00* (2013.01); *B33Y 10/00* (2014.12); *B33Y 30/00* (2014.12); *B33Y 40/00* (2014.12); *B33Y 50/02* (2014.12)

(56) References Cited

U.S. PATENT DOCUMENTS

| | | | | |
|---|---|---|---|---|
| 6,815,636 | B2* | 11/2004 | Chung | B29C 64/153 219/121.65 |
| 9,114,478 | B2* | 8/2015 | Scott | B23K 26/12 |
| 9,724,876 | B2* | 8/2017 | Cheverton | B29C 64/124 |
| 10,073,060 | B2* | 9/2018 | Redding | B33Y 30/00 |
| 10,207,363 | B2* | 2/2019 | Craig | G01J 5/0003 |
| 10,247,929 | B2* | 4/2019 | Ohno | B29C 64/153 |
| 10,786,850 | B2* | 9/2020 | Madigan | B23K 26/0626 |
| 10,898,969 | B2* | 1/2021 | Kanko | B33Y 10/00 |
| 2014/0104686 | A1* | 4/2014 | Yuasa | G02B 5/1857 359/575 |
| 2014/0263209 | A1 | 9/2014 | Burris et al. | |
| 2015/0177158 | A1 | 6/2015 | Cheverton | |
| 2016/0107380 | A1* | 4/2016 | Smoot | B29C 64/124 264/401 |
| 2016/0279707 | A1 | 9/2016 | Mattes et al. | |
| 2017/0017067 | A1 | 1/2017 | Ohno et al. | |
| 2017/0120518 | A1* | 5/2017 | DeMuth | B29C 64/386 |
| 2017/0151630 | A1 | 6/2017 | Huang et al. | |
| 2017/0225393 | A1* | 8/2017 | Shkolnik | B33Y 10/00 |
| 2017/0304947 | A1* | 10/2017 | Shibazaki | B22F 12/00 |
| 2019/0047226 | A1* | 2/2019 | Ishikawa | B22F 10/30 |
| 2021/0122120 | A1* | 4/2021 | Raghavan | B29C 64/393 |

OTHER PUBLICATIONS

International Search Report and Written Opinion for Application No. PCT/US19/42098 dated Oct. 4, 2019 (14 pages).

Kasunic, K, "Optical Systems Engineering," Chapter 3—Aberrations and Image Quality, McGraw-Hill, 2011 (63 pages).

Thombansen, U et al., "Process Observation in Selective Laser Melting (SLM)," Proceedings, SPIE, 2015 (7 pages).

* cited by examiner

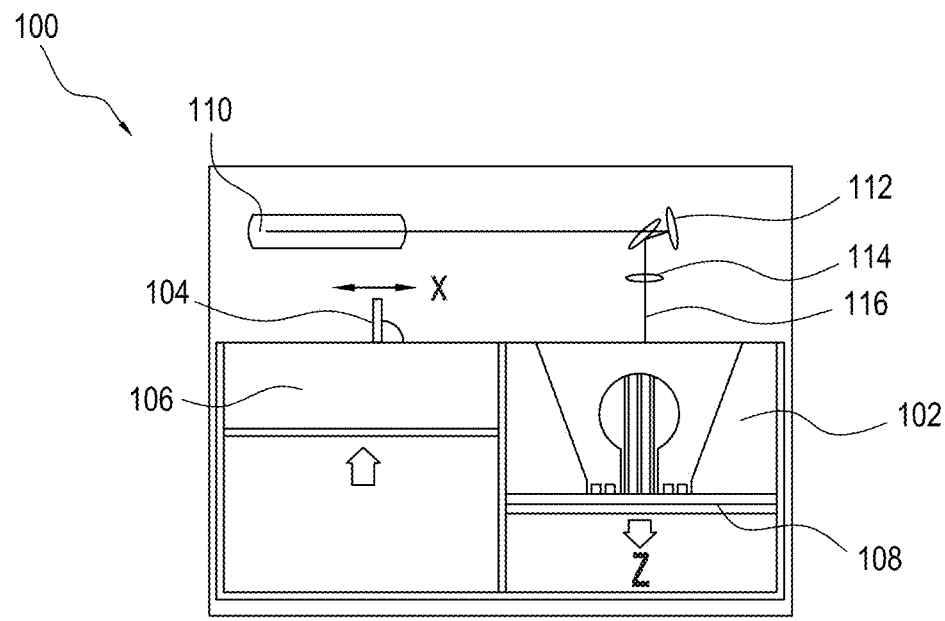
FIG. 1- PRIOR ART
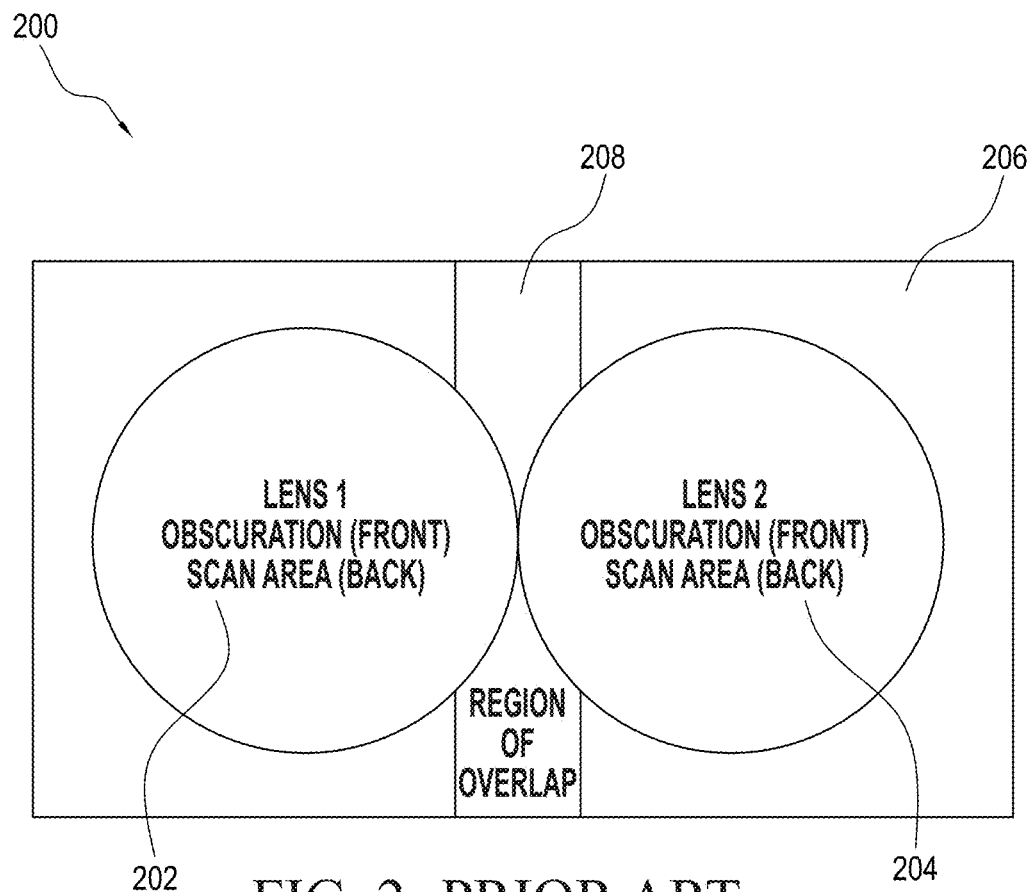
FIG. 2- PRIOR ART

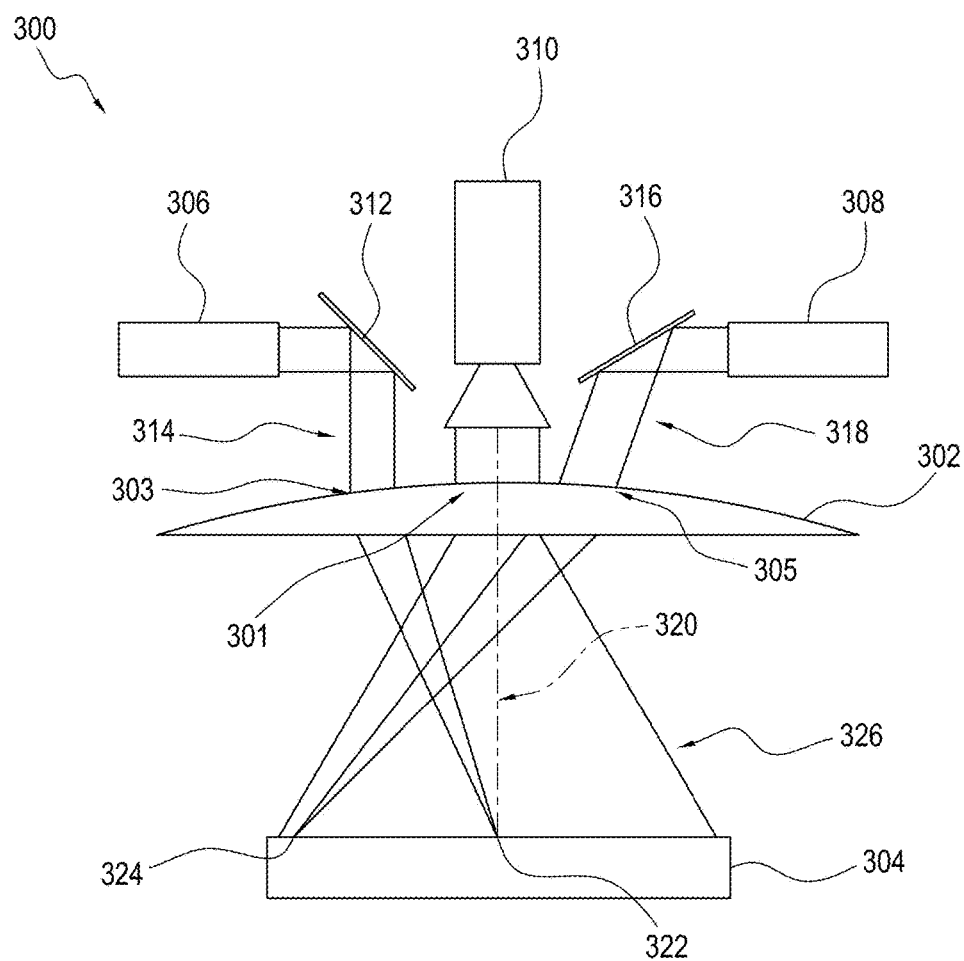
FIG. 3
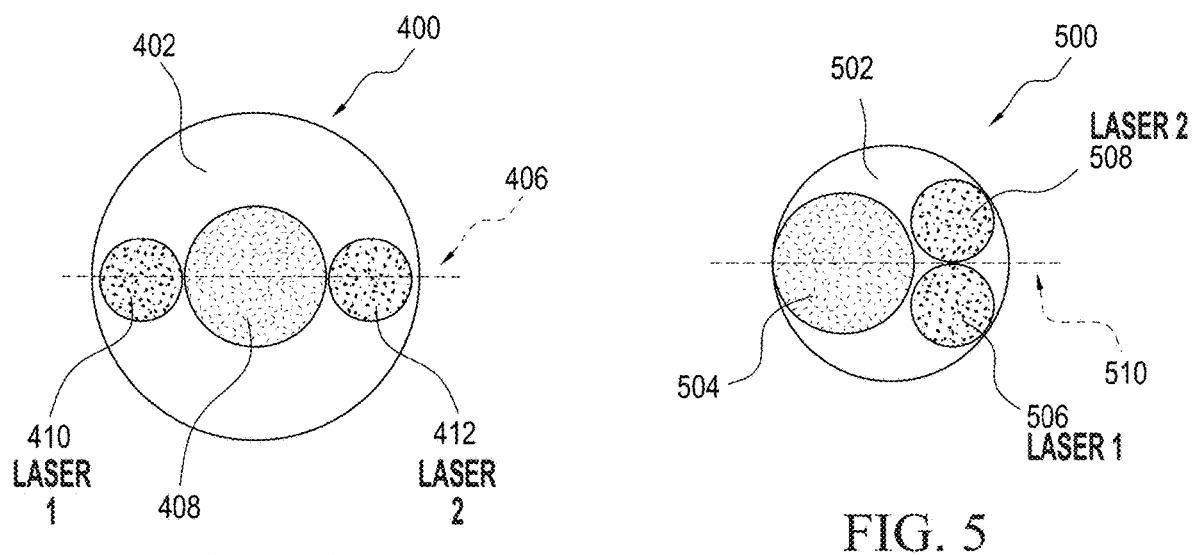
FIG. 4
FIG. 5

ADDITIVE MANUFACTURING VIA OPTICAL APERTURE DIVISION MULTIPLEXING

CROSS REFERENCE TO RELATED APPLICATION

The present application claims priority to and the benefit of U.S. Provisional Application No. 62/698,738, filed Jul. 16, 2018, and titled "Additive Manufacturing via Optical Aperture Division Multiplexing," the contents of which is incorporated herein by reference in its entirety.

FIELD

The present disclosure relates to systems, devices, and methods for additive manufacturing, and more particularly relates to utilizing optical aperture division multiplexing to perform additive manufacturing.

BACKGROUND

Additive Manufacturing (AM) has become a central technology for rapid prototyping and short run manufacturing. Selective laser melting (SLM) is perhaps the most ubiquitous method for metal AM. FIG. 1 schematically illustrates an SLM printer 100 for manufacturing a three-dimensional part 102. An SLM manufacturing process can begin with a recoater 104 collecting a volume of powdered build material from a supply well 106, and subsequently spreading a powder layer of the powdered build material over a build platform 108. The powder layer can be selectively irradiated via a laser 110, which is typically first steered by a pair of scanning (galvanometer) mirrors 112 and then focused by an f-θ lens 114. A laser beam 116 (i.e., a light path) can be focused to a high intensity laser spot on a building site and can be scanned in a pattern corresponding to a desired component cross section. Often complete densification and fusion of the build material to the prior layer results. The build platform and partially fabricated article can then move downwards, usually incrementally, to accommodate recoating of a following powder layer.

Commercially available SLM machines utilize f-θ lenses for beam delivery. The purpose of these lenses is twofold. First, they bring a large diameter (approximately in the range of about 5 mm to about 30 mm), collimated laser light to a focus on the build platform. Second, they map the angle of beam incidence with respect to the optical axis, set by the galvanometer mirrors, to a location on the build platform. In ideal conventional lens (e.g., camera lens) designs, or in the paraxial approximation of lens behavior, a distance d of the focus point from the optical axis of the lens is given by d=f tan(θ), where θ is the angle between the optical axis and incident light and f is the focal ratio. This non-proportional mapping greatly complicates laser toolpath generation. Therefore, f-θ lenses are designed such that d≈fθ. Optically, this is accomplished by using thick lens elements with substantial curvature and diameter to induce barrel distortion, i.e. magnification that decreases cubically as a function of radius in the image plane. By approximating an inverse tangent relation with this cubic function, it is possible to substantially offset the tangent nonlinearity described above, resulting in an approximately linear mapping.

Wider application of SLM, however, is confronted by at least two key challenges—low build rate and the need for process control to improve component quality. Both needs demand improved optical access to the build environment. Further, SLM machines represent a substantial capital investment, and recouping the cost often demands that machine-time contribute a larger fraction to overall component cost than feedstock and energy costs.

Volumetric build rate in SLM is limited by process physics, including the balance of energy flux and fluid dynamics. An approach may be to scan a laser beam faster over the surface while delivering proportionally higher laser power to melt more material per unit time. However, heat flux out of a melted region (e.g., a melt pool) is not instantaneous. Rather, a tail of molten material typically trails the irradiated region of build material, cooling at a rate primarily governed by conduction into previously solidified material. These dynamics are not substantially changed by increasing power and scan speed. Accordingly, increasing these parameters results in a longer liquid tail. If the tail becomes too elongated, a fluid dynamics effect known as the Rayleigh-Taylor Instability can occur. In this regime, surface tension effects between the metal and environment break up the liquid into a trail of discrete, poorly adhered beads, causing mechanically weak parts. Thus, conventionally, scaling the process to build rates higher than typical of SLM machines must occur by scaling the number of lasers directed to the build platform.

Larger machines often incorporate a plurality of lasers directed by such optics, however, their considerable size limits the number of lasers that can be used per unit area of build platform. By way of example, FIG. 2 schematically illustrates an SLM printer 200 having a first focusing lens with an obscuration and scan footprint 202 and a second focusing lens with an obscuration and scan footprint 204 on a build platform 206. Each focusing lens is a Thor Labs FTH254-1064 f-θ lens that is designed to cover an area of 156.7 mm×156.7 mm, with the lens having a diameter of 120 mm at its widest point. An area of overlap of the two lenses scanning region occurs only within a narrow band 208 of the build platform 206. Thus, as can be seen in FIG. 2, even close-packing lenses results in large areas of the build platform accessible by only one laser. Accordingly, build rate of an SLM machine is impacted by machine (e.g., build platform) size, which cannot typically be scaled to arbitrarily large dimensions.

Conventional f-θ lenses also present problems with respect to optical process monitoring, at least because f-θ lenses typically limit the performance of optical instrumentation. One approach is to use wavelength to multiplex an optical path for laser delivery and optical monitoring, such as by using a dichroic mirror. However, this approach, commonly called bore-sighting, results in poor spatial resolution for several reasons. First, the barrel distortion used to linearize the f tan(θ) response for laser delivery imparts the same distortion on light from a melt pool passing towards a camera used for imaging the AM process. Second, chromatic and other optical aberrations are usually significant at wavelengths removed from a designed (laser) wavelength, due, at least in part, to the substantial radii and lens element thickness required to generate the barrel distortion. The image data obtained from such an approach is therefore usually out of focus and blurred.

Alternatively, an AM process may be viewed side-on. This side-on method comes with its own set of optical challenges though, including that the lens employed typically must have substantial depth of field to image an entire region of interest. Additionally, because the camera lens is not perpendicular to the build platform, as forced by the size of the f-θ lens, perspective distortion usually results. Finally, the camera and lens cannot usually obscure the laser path, meaning the lens operates at a significant standoff distance while simultaneously providing a sufficient aperture to prevent diffractive effects from limiting resolution.

Optical access to a build chamber can be used for process monitoring, with an aim to detect defects and for implementing closed-loop process control that responds to the complex, and often unknown, boundary conditions and stochastic effects (e.g., random power distribution from recoating) inherent to SLM. Numerous methods for optical process interrogation exist, including imaging and non-imaging approaches, with and without auxiliary illumination. However, the optics used for laser delivery in SLM present a substantial impediment to optical process monitoring efficacy at least by degrading the quality of recorded process signatures. This degradation can result from forcing side-on observation to avoid interfering with the laser path and f–θ optic and/or from using the f–θ optic itself for bore-sighted process monitoring along the laser path.

Accordingly, there is a need for systems, devices, and methods that allow for improved optical access to a build environment and increased build efficiency during an AM process.

SUMMARY

The systems, devices, and methods described herein generally relate to an AM printer including an aperture division multiplexing optic ("multiplexing optic") that enables improved optical access to an additive manufacturing build environment. A multiplexing optic as disclosed can multiplex an arbitrary number of optical paths to a build platform. To multiplex a plurality of optical paths, the multiplexing optic can be an optical assembly of a large effective aperture that is subdivided into a plurality of sub-apertures. Each sub-aperture can be configured to multiplex an optical path (i.e., receive an input optical path and focus the optical path) to a build platform. An optical path may be, for example, a light path from a light source or an optical process monitoring path from an optical process monitoring device. Each sub-aperture may be independently configured to deliver a light path from a light source or an optical process monitoring path from an optical process monitoring device to the build platform. In this manner a plurality of optical paths can pass through a single multiplexing optic, each at a dedicated sub-aperture of the multiplexing optic, to the build platform. Such a configuration can enable increased build rate via improved laser field of view (FOV) overlap in multi-laser systems, reduced residual stresses in manufactured parts, and improved image quality for in-situ process monitoring.

One exemplary embodiment of a method for manufacturing a three-dimensional object includes disposing at least one layer of a build material on a build surface, disposing at least one additional layer of a build material on at least one of the build surface or the at least one layer disposed on the build surface, and delivering light to at least one of the build surface, the at least one layer on the build surface, or the at least one additional layer. The method further includes delivering at least one of additional light or optical process monitoring to at least one of the build surface, the at least one layer on the build surface, or the at least one additional layer. At least one of delivering light or delivering at least one of additional light or optical process monitoring occurs by dividing a theoretical input aperture of a multiplexing optic into a plurality of sub-apertures, and at least one of delivering light or delivering at least one of additional light or optical process monitoring occurs along a substantially common optical axis.

In some embodiments, disposing at least one layer on a build platform further includes at least one of fusing or depositing the at least one layer on the build platform. Disposing at least one additional layer on at least one of the build platform or the at least one layer disposed on the build platform can further include at least one of fusing or depositing the at least one additional layer. Disposing at least one layer and disposing at least one additional layer can occur based on a build plan.

At least one of delivering light or delivering additional light, if delivering additional light occurs, can include operating a laser to deliver the respective light or additional light. At least one of delivering light or delivering additional light, if delivering additional light is used, can further include fusing at least a portion of at least one layer of a build material and/or at least one additional layer of a build material. In some embodiments, at least one of delivering light or delivering additional light, if delivering additional light occurs, can include delivering the respective light or additional light via a plurality of light sources. In some such embodiments, at least one light source of the plurality of light sources can be directed through the multiplexing optic at a fixed angle. In other such embodiments, the plurality of light sources can operate at least two different wavelengths, with the at least two different wavelengths selected in response to at least one of a build material chemistry to achieve at least one of a desired locally varying elastic modulus, a desired fracture toughness, or a desired chemical resistance in the manufactured three-dimensional object or in response to a build material absorbance.

The multiplexing optic can include at least one element that affects only a subset of the plurality of sub-apertures. The multiplexing optic can include at least one reflective surface. In some embodiments, the multiplexing optic can include at least one element of a reflective, diffractive, aspherical, or freeform character, with the method further including operating the at least one element to give the at least one element at least one different focal property over one or more designated sub-apertures of the plurality of sub-apertures. In some such embodiments, the at least one element of the multiplexing optic is of freeform character. The multiplexing optic can be disposed between at least one light source and a galvanometer. In some embodiments, the multiplexing optic can include a plurality of multiplexing optics, with the plurality of multiplexing optics having independent optical axes, and at least one of delivering light or delivering at least one of additional light or optical process monitoring can occur by dividing a theoretical input aperture of one or more additional multiplexing optics of the plurality of multiplexing optics.

In some embodiments, the method can include placing one or more additional optics along an individual light path between the multiplexing optic and at least one of a light source or an optical monitoring system. In such embodiments, the at least one additional optic of the one or more additional optics can be configured to correct for chromatic aberration in the multiplexing optic.

The method can also include moving the multiplexing optic with respect to the build platform. In some such methods, moving the multiplexing optic with respect to the build platform can further include moving a gantry with respect to the build platform, where the multiplexing optic is fixed relative to the gantry.

In some embodiments, the method can further include operating a toolpath generation algorithm configured to maintain at least one of a desirable toolpath speed or a desirable toolpath in view of at least one of a simulated angle-position mapping or a measured angle-position mapping.

One exemplary embodiment of a system for manufacturing a three-dimensional object includes an additive manufacturing printer and a multiplexing optic. The additive manufacturing printer is configured to manufacture a three-dimensional object according to a build plan by at least one of fusing or depositing a plurality of layers of build material. The multiplexing optic is configured to deliver light from a light source to at least one of a layer of the plurality of layers of build material or a build surface, and is further configured to at least one of deliver light from an additional light source to at least one layer of the plurality of layers of build material or the build surface, or deliver an optical process monitoring path of an optical process monitoring system to at least one layer of the plurality of layers of material or the build surface along a substantially common optical axis of the multiplexing optic. Still further, the multiplexing optic is configured to divide its theoretical input aperture into a plurality of dedicated sub-apertures.

In some embodiments, the at least one light source can be a laser. The system can further include a light source from which the multiplexing optic is configured to deliver light. In some such embodiments, the system can also include at least one of an additional light source from which the multiplexing optic is configured to deliver light or an optical monitoring system configured to provide optical monitoring of the build surface along an optical process monitoring path. In some embodiments the at least one light source can be a plurality of light sources. In some such embodiments, at least one light source of the plurality of light sources can be directed through the multiplexing optic at a fixed angle.

The system can further include optical process monitoring instrumentation. The optical process monitoring instrumentation can have a field of vision that substantially overlaps a region of at least one layer of the plurality of layers of build material actively irradiated with the at least one light source.

In some embodiments, the multiplexing optic can include at least one element that affects only a subset of sub-apertures. The system can further include at least one additional multiplexing optic, with the at least one additional multiplexing optic having an optical axis that is independent with respect to an optical axis of any other multiplexing optic. In some embodiments, at least one additional optic can be placed along an individual light path that extends between the multiplexing optic and at least one of the light source or the optical monitoring system. In some such embodiments, at least one of the additional optic can be configured to correct for chromatic aberration in the multiplexing optic.

At least one of the dedicated sub-apertures of the multiplexing optic can include at least one element of a reflective, diffractive, aspherical, or freeform character, and the at least one element can be configured to give the at least one of the dedicated sub-apertures a different focal property than one or more of the remaining dedicated sub-apertures. In some such embodiments, the at least one element can be of freeform character. In some embodiments, the multiplexing optic can include at least one mirror element. In some embodiments, the multiplexing optic can be located between a galvanometer and one of the light source or the additional light source.

The system can further include a gantry configured to provide motion to the additive manufacturing printer with respect to a platform on which the plurality of layers of build material is delivered. The motion can be in at least one dimension, and the multiplexing optic can be in a fixed location with respect to the gantry. In some embodiments of such systems, at least one of the light source or the additional light source can be configured to be directed by a galvanometer. In other embodiments of such systems, a plurality of light sources can be directed through the multiplexing optic at fixed angles.

The system can further include a toolpath generator configured to generate a toolpath for maintaining at least one of a desirable toolpath speed or a desirable toolpath, in view of at least one of a simulated angle-position mapping or a measured angle-position mapping.

BRIEF DESCRIPTION OF DRAWINGS

This disclosure will be more fully understood from the following detailed description taken in conjunction with the accompanying drawings, in which:

FIG. 1 is a schematic side view of a known SLM printer;

FIG. 2 is a schematic top view of a lens footprint of a known SLM printer;

FIG. 3 is a schematic side view of one exemplary embodiment of an AM device that includes a multiplexing optic;

FIG. 4 is a schematic top view of one exemplary embodiment of a multiplexing optic in conjunction with an optical path footprint diagram that results from a configuration of the multiplexing optic;

FIG. 5 is a schematic top view of another exemplary embodiment of a multiplexing optic in conjunction with an optical path footprint diagram that results from a configuration of the multiplexing optic;

GENERAL DESCRIPTION

Certain exemplary embodiments will now be described to provide an overall understanding of the principles of the structure, function, manufacture, and use of the devices, systems, and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure. By way of non-limiting example, terms such as "manufacturing," "building," and "printing" may be used interchangeably herein and a person skilled in the art will understand the same. Still further, the present disclosure provides some illustrations and descriptions that includes prototypes, bench models, and or schematic illustrations of set-ups. A person skilled in the art will recognize how to rely upon the present disclosure to integrate the techniques, systems, devices, and methods provided for into a product, such as a consumer-ready, factory-ready, or lab-ready three-dimensional printer.

The present disclosure is generally directed to systems, devices, and methods for additive manufacturing with improved optical access to a build platform using an aperture division multiplexing optic (multiplexing optic or ADM optic) to multiplex an arbitrary number of optical paths to the build platform. More particularly, a multiplexing optic can be used to direct a plurality of independent optical paths, including off-axis optical paths, to a build platform along a substantially common optical axis. An independent optical path can be a light path from a light source or an optical process monitoring path from an optical process monitoring device.

Figure 15:
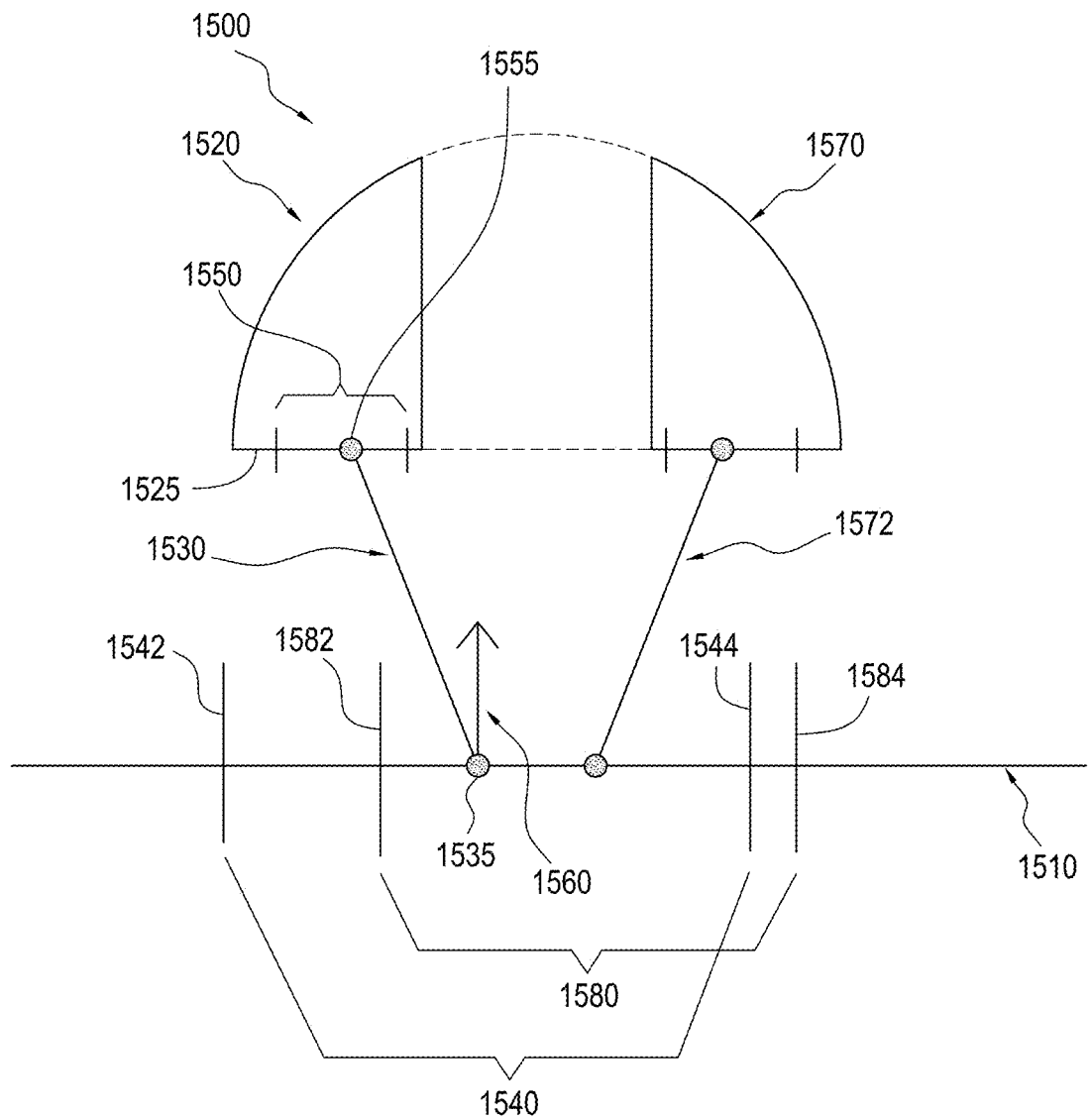
FIG. 15 is a diagram illustrating optical characteristics of an exemplary embodiment of a multiplexing optic.

It is helpful to define several concepts, as used herein, for a fuller understanding of the disclosure. These concepts are described with reference to FIG. 15. A common axis of a multiplexing optic can be defined as a theoretical line normal to a surface to which the multiplexing optic directs one or more optical path(s) towards (e.g., a theoretical ray 1560 that is normal to a build platform 1510). A sub-aperture of a multiplexing optic, for example sub-aperture 1520 of a multiplexing optic 1500, can be configured as an off-axis sub-aperture when a theoretical ray 1530 that propagates from a center 1535 of a field of view (FOV) 1540 of the sub-aperture to a centroid 1555 of an optical footprint 1550 of a distal surface 1525 of the sub-aperture 1520, propagates along a direction that is not parallel to the build plane normal (e.g., as represented by optical axis 1560). A multiplexing optic of the present disclosure can include at least one such off-axis sub-aperture. An optical axis of an individual sub-aperture can be defined as a theoretical ray from a centroid of a FOV of the sub-aperture that propagates normal to the surface. For example, theoretical ray 1560 propagates normal to the build surface 1510 from the centroid 1535 of the FOV 1540 of sub-aperture 1520. Accordingly, the theoretical ray 1560 can represent an optical axis of the sub-aperture 1520. Finally, an optical axis of a first sub-aperture can be considered to be substantially common with an optical axis of a second sub-aperture if the optical axis of the first sub-aperture intersects a FOV of the second sub-aperture. With reference to FIG. 15, the optical axis 1560 of the sub-aperture 1520 is substantially common with an optical axis of a second sub-aperture 1570 because the optical axis 1560 of the sub-aperture 1520 intersects a FOV 1580 of the second sub-aperture 1570. The second sub-aperture 1570 can be an off-axis sub-aperture with a theoretical ray 1572 that propagates from a center of the FOV 1580 of the sub-aperture to a centroid of an optical footprint of a distal surface of the sub-aperture 1570, propagates along a direction that is not parallel to the build plane normal. As shown, a FOV 1540 of the sub-aperture 1520 is defined by a first limit 1542 and a second limit 1544, while a FOV 1580 of the second sub-aperture 1570 is defined by a first limit 1582 and a second limit 1584.

The multiplexing optic can be a large aperture optic having a theoretical input aperture divided into a plurality of sub-apertures. Each of the plurality of sub-apertures can be independently capable of directing and delivering an optical path, or a plurality of optical paths, to a build platform. One or more of the sub-apertures of the multiplexing optic can direct an optical path, or a plurality of optical paths, that enters the multiplexing optic off-axis with respect to the multiplexing optic optical axis. The multiplexing optic can include at least one element (i.e., a mirror element or a lens element) that affects only a subset of the sub-apertures. The multiplexing optic can be divided such that a particular sub-aperture of the plurality of sub-apertures of a multiplexing optic can receive an optical path, or a plurality of optical paths, from a particular light source or optical process monitoring device such that the particular sub-aperture functions as a dedicated sub-aperture for the particular light source or optical process monitoring device. Furthermore, the multiplexing optic can be designed and operated such that at least one element of the multiplexing optic can have at least one different focal property over one or more dedicated sub-apertures of a plurality of sub-apertures of the multiplexing optic. By way of non-limiting example, a focal property can be a focal length or a spot size. In some embodiments, an AM printer can include a plurality of multiplexing optics, with each multiplexing optic having an independent optical axis.

Using a multiplexing optic to multiplex a plurality of independent optical paths improves optical access to a build platform. This enables an increased build rate by way of improved light source field of view overlap on a build platform in a multi-light source system. In this manner, processing time (i.e., build time) can be reduced by using a plurality of light sources, each having a dedicated sub-aperture in a multiplexing optic that directs a light path from each of the light sources to the build area without having to scale the build area itself. In other words, a plurality of light sources can be used to irradiate a build area with a focused light path by giving each of the plurality of light sources a dedicated sub-aperture in a multiplexing optic. Additionally, a multiplexing optic can allow for more effective coordinated action of a plurality of light sources. For example, one or more of a plurality of light sources can be directed using a galvanometer and/or moved in accordance with motion of a gantry carriage. The AM process can be designed, for example, to coordinate motion of the plurality of light sources to minimize thermal gradients in a printed three-dimensional component. Further, a multiplexing optic can provide a dedicated sub-aperture for an optical process monitoring path of an optical process monitoring device such that image quality for in-situ process monitoring is improved by facilitating a more direct monitoring of the build platform without interference from other optical paths.

The terms "optic" and "lens" are taken to include at least one optical element. An optic can be lens-based, mirror-based, or a combination of the two. As used herein, an "optical element" refers to a subset or sub-region of an optic. An optic is commonly, although not always, made up of a plurality of optical elements. For example, a single multiplexing optic can include multiple optical elements, with each optical element being defined by a particular lens surface and/or a particular reflective surface. A reflective surface can be a polished or smooth surface that reflects light (e.g., a mirror surface). Accordingly, a multiplexing optic of the present disclosure can include one or more lens element(s), mirror element(s), or a combination of the two. An optical surface of an optic or an optical element may include at least one of a concave, convex, planar, aspheric, freeform, or diffractive surface profile. A freeform optical surface refers to a non-symmetric surface, and, more particularly, to a surface to which there is no common axis of rotation. A diffractive element can be considered a general subset of a freeform optical surface. While rotationally symmetric off-axis elements have a well-defined axis, freeform optics and many potential diffractive surfaces do not have such a theoretical feature. Reference to an optical element, a lens element, and/or a mirror element, as used herein, refers to a subset (e.g., a sub-aperture or a sub-region) of a larger optic.

In some embodiments, the term "light source" as used herein can refer to any source of optical radiation of sufficient intensity to deposit or fuse a build material in an additive manufacturing process. In other embodiments, a "light source" can refer to a source of optical radiation for preheating a build material, for providing illumination, or for providing an optical indication (e.g., a probe light of an optical instrument). By way of non-limiting example, a light source can include a laser, a light-emitting diode, a super luminescent light-emitting diode, and/or an incandescent bulb.

While discussion of a multiplexing optic refers to focusing an optical path to a build platform, it will be appreciated that during an additive manufacturing process in which build material placed on a build platform and/or prior layers of build material, an optical path focused towards the build platform contacts build material if build material is present on the build platform. The term "build plane" or "build surface" may be used to reference a plane where at least one of a printing, a fusion of build material, and/or a focus of optical paths occurs. In some instances, the build plane or build surface can be located across the build platform itself, while in other instances the build plane or build surface can be located across at least a portion of a powdered material and/or a previously irradiated or fused powdered material.

FIG. 3 schematically illustrates an exemplary embodiment of an SLM printer 300 of the present disclosure. In the illustrated embodiment, the SLM printer 300 includes a multiplexing lens optic 302. As will be discussed in further detail below, alternative embodiments of a multiplexing optic can include one or more mirror elements. As shown, the multiplexing lens optic 302 has a large theoretical input aperture divided into a plurality of sub-apertures 301, 303, and 305 (non-limiting, exemplary sub-aperture configurations are illustrated and discussed in greater detail with respect to FIGS. 4 and 5 below), with each sub-aperture configured to direct an independent optical path to a build platform 304. In some embodiments, the lens 302 can be a spherical singlet lens. The printer 300 can further include a first light source 306, a second light source 308, and/or an optical process monitoring device 310. In some embodiments, one or both of the first light source 306 and the second light source 308 can be a laser. Further, in some embodiments, the optical process monitoring device 310 can be a camera. Embodiments of the present disclosure are not limited to the configuration of the SLM printer 300 as illustrated in FIG. 3. Rather, an AM printer with a multiplexing optic of the present disclosure can include a greater or fewer number of light sources and/or optical process monitoring devices based on a particular application, system design, and/or user preference. Further, one or more light sources (e.g., the light sources 306 and 308) and/or monitoring systems (e.g., the optical monitoring system 310) can be independently provided such that they are used in conjunction with the lens 302 and other components of the printer 300 without being provided as part of the printer itself.

The printer 300 can further include a first galvanometer 312, which can be used to direct a first light path 314 from the first light source 306 to the multiplexing optic 302. Likewise, a second galvanometer 316 can be used to direct a second light path 318 from the second light source 308 to the multiplexing optic 302. Accordingly, the first light path 314 and the second light path 318 can be simultaneously directed to discrete locations on the build platform 304 using the first galvanometer 312 and the second galvanometer 316, respectively, to control light path entry into the multiplexing optic 302. As will be discussed in detail below, in some embodiments a controller can be used to control one or more of a galvanometer and a light source based on a desired toolpath and/or print plan. By way of non-limiting example, in some embodiments a print plan can direct a plurality of light paths to do one or more of coincide at a build surface, follow an identical toolpath separated by a short distance, scan completely independently of one or more other light paths of the plurality of light paths, etc. In some embodiments, a multiplexing optic can be placed between a light source and a galvanometer. Alternatively, as will be discussed in detail below, an AM printer with a multiplexing optic can include one or more optic paths that are directed through the multiplexing optic without the use of a galvanometer. In such embodiments, one or more light sources or optical process monitoring devices can be placed at a fixed angle with respect to the multiplexing optic such that an optical path from the one or more light sources or optical process monitoring devices pass through the multiplexing optic at a fixed angle.

In the embodiment shown in FIG. 3, the first light path 314 enters the multiplexing optic 302 substantially parallel, but considerably displaced from, a multiplexing optical axis 320. As discussed above, the first galvanometer 312 directs the first light path 314 to a dedicated sub-aperture 303 of the multiplexing optic 302. The dedicated sub-aperture 303 for the first light path 314 focuses the first light path 314 to a first point 322 on the build platform 304. In the illustrated configuration, the first point 322 is on-axis with respect to the optical ADM axis 320, although other locations are possible. As used herein, the term "dedicated sub-aperture" refers to a sub-aperture through which an optical path is directed or intended to pass. While sub-apertures as illustrated in the figures are shown as distinct regions of an optic for clarity, in some embodiments, sub-apertures of an optic may overlap. For example, in applications where a light path is directed by a galvanometer before impinging upon an ADM optic, it is likely that one or more sub-apertures of the ADM optic may overlap with each other.

Returning to FIG. 4, the second light path 318 is directed to the multiplexing optic 302 by the second galvanometer 316 such that the second light path 318 enters a second dedicated sub-aperture 305 of the multiplexing optic 302 both off-axis and off-angle with respect to the multiplexing optical axis 320. The dedicated sub-aperture 305 for the second light path 318 focuses the second light path 318 to a second point 324 on the build platform 304. In the illustrated configuration, the second point 324 is off-axis with respect to the optical ADM axis 320 and is located in a lateral portion of the build platform, although other locations are possible. A focal point of an optical path multiplexed to a build platform by a multiplexing optic can be dictated by characteristics of the printer system. For example, by adjusting characteristics of the SLM printer—for example an angle of a galvanometer, optical properties of a light path, and/or an optical surface of a multiplexing optic or sub-aperture—a location to which the multiplexing optic directs a particular optical path can be adjusted.

Embodiments of the present disclosure are not limited to two light sources. Rather, any number of light sources can be used based on a particular application, system design, and/or user preferences. In some embodiments, a plurality of light sources can be used and can be operated at at least two different wavelengths. In some such embodiments, a plurality of light sources can be simultaneously operated at different wavelengths and/or at different power levels. Optionally, a wavelength of operation can be selected based on one or more of the following factors: a build material chemistry, a build material absorbance, a desired locally varying elastic modulus of a manufactured component, a desired fracture toughness of a manufactured component, or a desired chemical resistance of a manufactured component.

In the illustrated embodiment of FIG. 3, a camera 310 can serve as an optical process monitoring device for imaging an additive manufacturing process. The camera 310 can be placed such that an optical process monitoring path of the camera is substantially collinear with the multiplexing optical axis 320. With the optical process monitoring path substantially parallel to the multiplexing optical axis, there is no perspective distortion, or at least no discernable perspective distortion, of an image detected by the optical process monitoring device. Accordingly, the detected image can provide quality data for component quality assessment and process control. The multiplexing optic 302 can multiplex the optical process monitoring path of the camera 310, via the sub-aperture 301, such that the camera can have a field of vision 326 that substantially overlaps a region of the build platform 304 that is actively irradiated by one or more light sources. In this case, the field of vision 326 encompasses a region of the build platform 304 including both the first point 322 of the focused first laser path 314 and the second point 324 of the focused second laser path 318.

As discussed above, a multiplexing optic can be a lens having a large input aperture that is divided into a plurality of sub-apertures. A lens used as a multiplexing optic can have a low focal ratio (also referred to as an "f-number" or "f#"), which is the ratio of an optic focal length to diameter, to accommodate a plurality of multiplexed optical paths. This is contrary to conventional optics, in which a focal ratio is maximized to the point of causing diffractive effects and/or to reduce aberrations (i.e., to reduce a region of space over which light is spread out rather than focused to a point).

Using a minimum-spherical singlet as a multiplexing optic, an angular spot size at best focus (β) arising from spherical aberration, coma, and astigmatism is given by Eqns. 1a to 1c, respectively.

$$\beta_s = \frac{K}{f/\#^3} \qquad \text{Eqn. 1a}$$

$$\beta_c = \frac{\theta}{16\,(n+2)(f/\#)^2} \qquad \text{Eqn. 1b}$$

$$\beta_a = \frac{\theta}{2(f/\#)} \qquad \text{Eqn. 1c}$$

Here, K is a function of refractive index and curvature, n is the refractive index of a sub-aperture element, and θ is an angle subtended between a multiplexing optical axis and a collimated input. For example, with reference to FIG. 3, the first light path 314 enters the multiplexing optic 302 substantially parallel to the multiplexing optic optical axis 320 such that θ=0 (or is substantially close to 0). The second light path 318 enters the multiplexing optic 302 off-angle such that θ≠0. As is evident from the Eqns. 1a to 1c, optical performance falls sharply at an increasing radius from a multiplexing optic lens axis. Accordingly, a multiplexing optic lens may include a lens surface with at least a portion of the surface featuring a substantial aspheric or freeform character to best offset these performance effects. In some embodiments, an entire multiplexing optic lens can feature a substantial aspheric or freeform character. In other embodiments, an optical surface with a substantial aspheric or freeform character can be limited to one or more sub-apertures, or a portion of one or more sub-apertures, of a multiplexing optic lens.

A multiplexing optic can include a plurality of sub-apertures or elements, with each sub-aperture dedicated to receiving a specific optical path and directing the optical path to a build platform. Accordingly, and as schematically illustrated in FIGS. 4 and 5, a sub-aperture need not cover a diameter of the ADM lens optic necessary to enclose all optical paths entering the multiplexing optic. Rather, a sub-aperture for receiving a particular optical path can comprise only a portion of an optical surface of the multiplexing optic being used by the specific optical path. In some embodiments, each sub-aperture can be made from a material that is tailored to the specific optical path to which the sub-aperture receives. By way of non-limiting example, a multiplexing optic can include a first sub-element fabricated from N-BK7 optical glass for receiving a light path from a laser, and a second sub-element fabricated from zinc selenide for imaging (i.e., for receiving an optical process monitoring path from an optical process monitoring device). In some embodiments, a first sub-element and a second sub-element can be arranged such that an optical axis of the first sub-element and an optical axis of the second sub-element are approximately co-incident.

Alternatively, an ADM lens optic can use a freeform character of an optical surface to tailor sub-regions of a monolithic lens substrate for certain processes. For example, a multiplexing optic can have a first region with a spherical, plano-convex optical surface intended to focus about 1064 nm light fabricated with a first radius. The same multiplexing optic can have a second region designed to focus about 2.5 μm light with a radius cut smaller than the first region to compensate for the decreased refractive index at the longer wavelength. A multiplexing optic, or a portion of a multiplexing optic, that is divided into a plurality of sub-apertures, can be fabricated with a freeform character such that at least one optical element has at least one different focal property over one or more of the plurality of sub-apertures. By way of non-limiting example, the focal property can be a focal length or a spot size.

Further tailoring of optical behavior with a multiplexing lens optic can be achieved by placing one or more optics along an optical path upstream of the multiplexing lens optic. For example, a modestly divergent optic can be placed in line with a laser operating at about 1064 nm such that the laser comes to a focus in a plane coincident with collimated about 2.5 μm light for optical process monitoring at the longer wavelength.

FIGS. 4 and 5 schematically illustrate multiplexing optics divided into a plurality of dedicated sub-apertures. FIG. 4 shows a top view of a multiplexing optic 400, and schematically illustrates a representative optical path footprint diagram on a top surface 402 of the multiplexing optic. The top surface 402 also represents the footprint of an aperture of the multiplexing optic 400. The large aperture of the multiplexing optic 400 has been divided into a plurality of sub-apertures 408, 410, and 412 to accommodate a configuration of an AM printer having two light sources and an optical process monitoring device, such as that shown with respect to FIG. 3. As shown, the three sub-apertures 408, 410, and 412 can be placed approximately along a mid-line 406 of the optic. The first sub-aperture 408 can be approximately centered with respect to the ADM aperture and top surface 402. The first sub-aperture 408 can be configured to receive an optical path from an optical process monitoring device (e.g., a camera). A size of the first sub-aperture 408 can be based, at least in part, on a field of view of the optical process monitoring device at a point of entry into the multiplexing optic. A second sub-aperture 410 can be placed approximately along the mid-line 406 to the left of the first sub-aperture 408, while a third sub-aperture 412 can be placed approximately along the mid-line 406 to the right of the first sub-aperture. The second sub-aperture can be configured to receive an optical path from a first light source, while the third sub-aperture 412 can be configured to receive an optical path from a second light source. In this manner, each of the optical process monitoring device, the first light source, and the second light source can have a dedicated sub-aperture for their respective optical paths through the multiplexing optic. As discussed above, a configuration placing an optical process monitoring device on-axis with respect to the multiplexing optic axis can prioritize image quality. However, other configurations of a light source, and at least one of an additional light source and/or an optical process monitoring device, are within the scope of the present disclosure.

FIG. 5, for example, illustrates an alternative configuration of a multiplexing optic 500 that can be used in conjunction with an AM printer, the optic 500 configured to multiplex optical paths from a first light source, a second light source, and an optical process monitoring device. Unlike the embodiments of FIGS. 3 and 4, however, all optical paths enter the multiplexing optic 500 off-axis with respect to an optical axis of multiplexing optic. Such an off-axis configuration of optics allows for a reduction in a diameter of the multiplexing optic, as illustrated by comparing the illustrated diameters of the optics 400 and 500 in FIGS. 4 and 5.

A top surface 502 of the multiplexing optic 500 is shown in FIG. 5, which represents a large input aperture of the multiplexing optic 500. The large input aperture of the multiplexing optic 500 is divided into three sub-apertures—a first sub-aperture 504, a second sub-aperture 506, and a third sub-aperture 508. The first sub-aperture 504 can be configured to receive an optical process monitoring path from an optical process monitoring device (e.g., a camera). The second sub-aperture 506 can be configured to receive a light path from a first light source, while the third sub-aperture 508 can be configured to receive a light path from a second light source. As illustrated, the first sub-aperture 504 can be approximately centered with respect to a horizontal mid-line 510 of the multiplexing optic 500. The second sub-aperture 506 can be located fully, or substantially fully, below the horizontal midline 510. The third sub-aperture 508 can be located fully, or substantially fully, above the horizontal midline 510. In such a configuration, each of the plurality of sub-apertures are placed such that an optical path entering the multiplexing optic 500 is off-axis with respect to the optical axis of the multiplexing optic.

Figure 6:
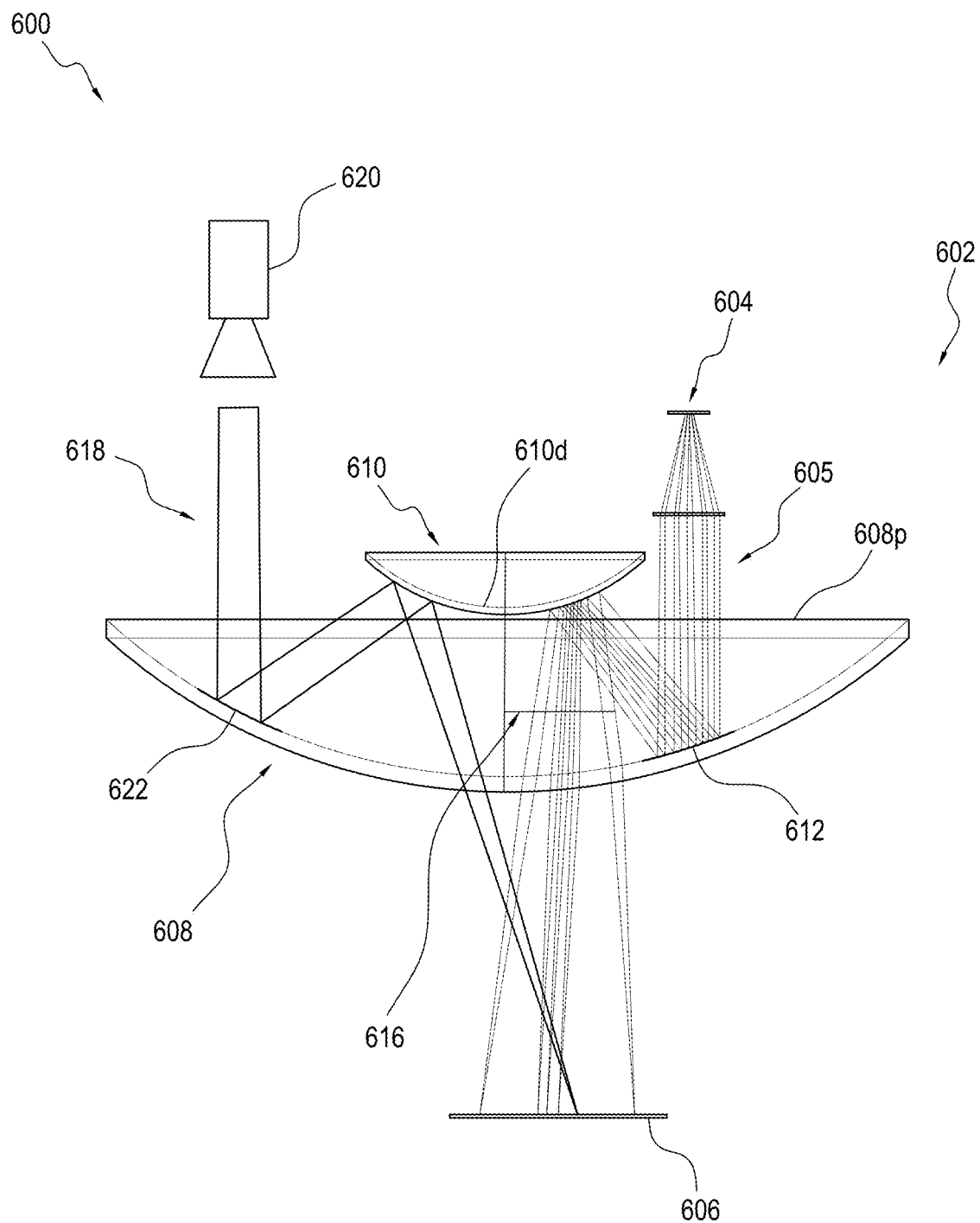
FIG. 6 is a ray trace diagram illustrating a side view of an exemplary embodiment of two multiplexing optics of an AM device, including a plurality of optic paths.

Alternative exemplary embodiments of a multiplexing optic can include one or more mirror elements. FIG. 6 depicts a ray trace 600 from an exemplary embodiment of a multiplexing optic 602 that includes mirror elements. In the illustrated embodiment, the multiplexing optic 602 includes a first reflective multiplexing optic 608, a second reflective multiplexing optic 610, and a transmissive lens optic 616. The multiplexing optic 602 can direct a plurality of light paths (collectively indicated in FIG. 6 as 605) from a light source 604, with each light path of the plurality of light paths coming to focus on a point located on a build platform 606 as a function of a light path angle with respect to an optical axis of a first optical element 608. As shown, the first multiplexing optic 608 has a larger diameter and height than the second multiplexing optic 610, with centers of the two optics 608, 610 being substantially collinear, and the second optic 610 being disposed above the first optic 608—as shown, a distal terminal end 610d of the second optic 610 is located above a proximal terminal end 608p of the first optic 608. The transmissive lens optic 616 can be placed such that the transmissive optic 616 can affect only a sub-aperture of the first reflective multiplexing optic 608 along an optical path from the light source 604 to the build platform 606. As shown, the lens optic 616 can be a paraxial lens (horizontal lens). Other configurations and sizes of the optics 608, 610, and 616 are possible without departing from the spirit of the present disclosure.

The plurality of light paths 605 can enter the first reflective multiplexing optic 608 as can be seen from a sub-aperture footprint 612 on the reflective optic 608 of the plurality of light paths 605. The first multiplexing optic 608 can be arranged such that the plurality of light paths 605 are reflected to contact the second multiplexing optic 610. The second multiplexing optic 610 can then direct the plurality of light paths 605 through the transmissive lens element 616, thereby focusing the plurality of light paths 605 to discrete locations on the build platform 606. A large aperture of the first optic 608 can allow for additional optical paths, for example additional light paths for illumination or optical sensing instruments, to be similarly directed to the build platform 606. For example, one or more additional optical path(s) 618 from an optical monitoring instrument 620 can pass through an alternate sub-aperture of the first optic 608 (indicated by the alternate sub-aperture footprint 622). The alternate sub-aperture of the first optic 608 can direct the one or more additional optical path(s) 618 to the second optic 610, which can reflect the one or more additional optical path(s) 618 to discrete locations on the build platform 606.

Inclusion of one or more mirror elements in a multiplexing optic can reduce or eliminate the presence of any transmissive optics in an optical path. Moreover, because an effective focal length of a mirror is not a function of wavelength, the use of a mirror(s) to multiplex an optical path can reduce and/or eliminate chromatic aberrations, which can occur when using a transmissive lens optic. More particularly, situations involving lasers operating at a plurality of wavelengths, or a wideband process monitoring being performed substantially removed from a laser line (e.g., the combination of Midwave Infrared (MWIR) monitoring from about 3 µm to about 5 µm and Nd:YAG laser at about 1064 nm) are prone to chromatic aberrations. Furthermore, mirrors can be easier and less costly to fabricate at large diameters. Accordingly, manufacturing considerations may suggest a mirror-based (catoptric) and/or a hybrid lens-mirror (catadioptric) multiplexing optic.

Multiplexing Optic Application with Gantry-Based Scanning Methods

Multiplexing optic systems, devices, and methods of the present disclosure can be applied to gantry-based scanning methods for high-throughput SLM, and other gantry or carriage-based AM printing methods. Gantry-based systems can be beneficial in that only small sub-regions of a build platform need to be optically addressed at a given time because gross optical scanning can be accomplished through gantry motion. Accordingly, by limiting a required optical field of access, higher optical resolution can be achieved for both laser delivery (e.g., small spot size) and for optical monitoring instrumentation.

Figure 7:
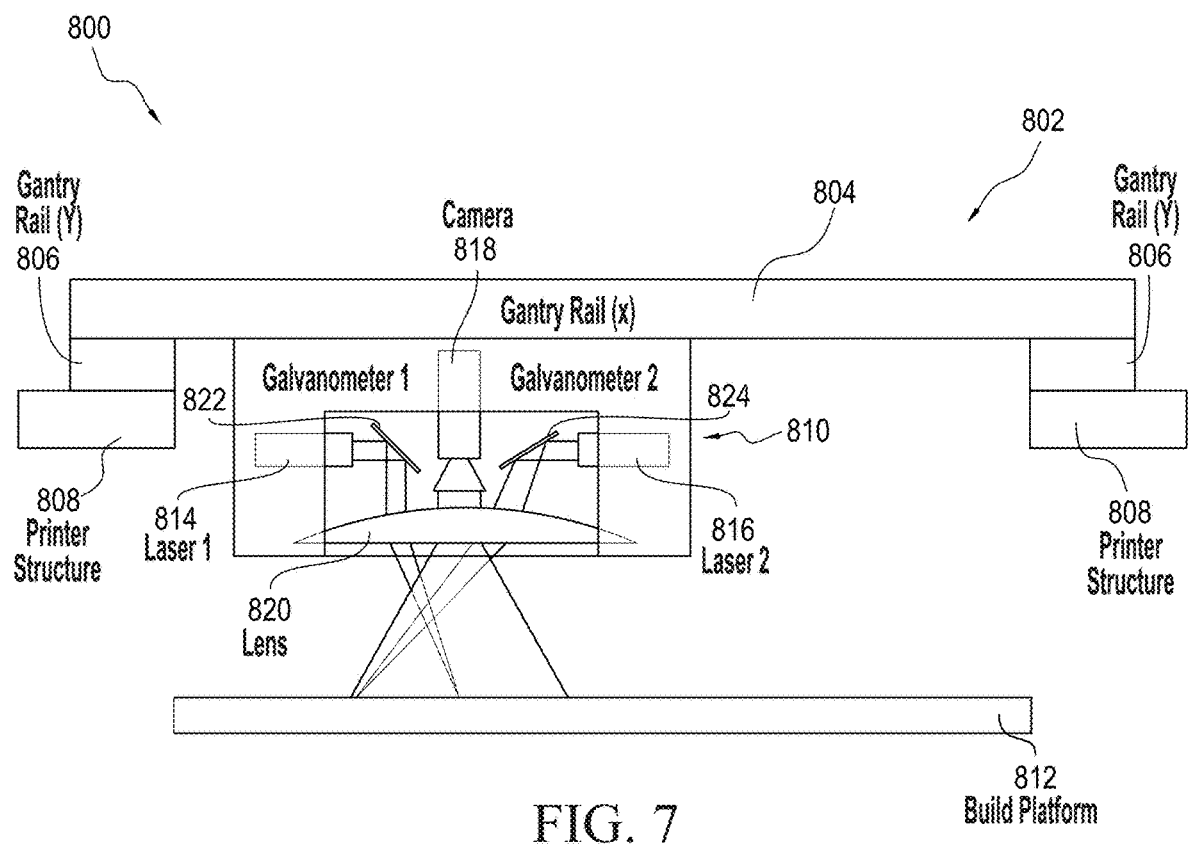
FIG. 7 is a schematic side view of an exemplary embodiment of a scanning-based AM device that includes a multiplexing optic.

FIG. 7 illustrates an exemplary gantry-based SLM system 800. In some embodiments, an optics head of an SLM printer can be mounted to a gantry 802. More particularly, the gantry 802 can include a gantry rail 804 extending in an "x-direction" along a horizontal axis of the page, a first and a second gantry rail 806 extending in a "y-direction" along an axis extending into and out of the page, and a gantry carriage 810 coupled to the gantry rail 804. The gantry 802 can be coupled to a body 808 of the SLM printer 800 and can be configured to move in at least one direction relative to a build platform 812. In some embodiments, a gantry can be provided that allows for movement across up to six directions, i.e., in both directions in the x, y, and z planes.

An optics head can be coupled to the gantry carriage 810 such that the optics head moves in conjunction with movement of the gantry carriage. As shown, the optics head is the gantry carriage 810, although in other embodiments the components can be separate. An optics head can include a light source, at least one galvanometer, a multiplexing optic, and/or at least one of an additional light source or an optical monitoring device. For example, in the illustrated embodiment, the optics head 810 includes a first light source 814, a second light source 816, and an optical monitoring device 818, each of which can emit an optical path that can be directed through a multiplexing optic 820 towards the build platform 812. In other embodiments, the optics head may only include the multiplexing optic 820, with components such as a light source(s) and an optical monitoring device(s) being separately provided from the optics head.

The multiplexing optic 820 can be fixedly attached to the gantry carriage 810. A first galvanometer 822 can be used to direct a light path from the first light source 814 to the multiplexing optic 820, as described above. A second galvanometer 824 can be used to direct a light path from the second light source 816 to the multiplexing optic 820, as described above. While FIG. 7 illustrates an exemplary embodiment of a gantry-based SLM system having two light sources, with a light path from each light source being directed by a galvanometer, any number of light sources can be used based on a particular application, system design, and/or user preferences. Moreover, a light path from each light source need not be directed by a galvanometer. Alternatively, a light path from a light source could be directed by a plurality of galvanometers.

Optical monitoring of an AM process may be incorporated in a gantry-based scanning AM procedure by dedicating a path (e.g., a sub-aperture) of the multiplexing optic for an optical monitoring path. For example, as shown in FIG. 7, the optical monitoring device 818, in the form of a camera, can be mounted on the gantry carriage 810. The camera is mounted such that the camera lens axis is approximately co-axial with a multiplexing optical axis. As discussed above, in other embodiments, the camera can be mounted off axis with respect to the lens.

The gantry carriage 810 can move in one or more directions relative to the build platform 812. Accordingly, with the optics head being one-and-the-same with the gantry carriage 810, the optics head moves along with the gantry carriage relative to the build platform 812. Scanning a light path to irradiate a build material on the build platform 812 can be accomplished by directing the gantry carriage 810 over a region to be scanned and holding the carriage 810 in a fixed position while one or more light paths is directed by one or more galvanometers through a multiplexing optic(s) and onto the build platform. In some advanced embodiments, gantry motion can be synchronized with galvanometer motion to achieve a more time-efficient processing.

Figure 8:
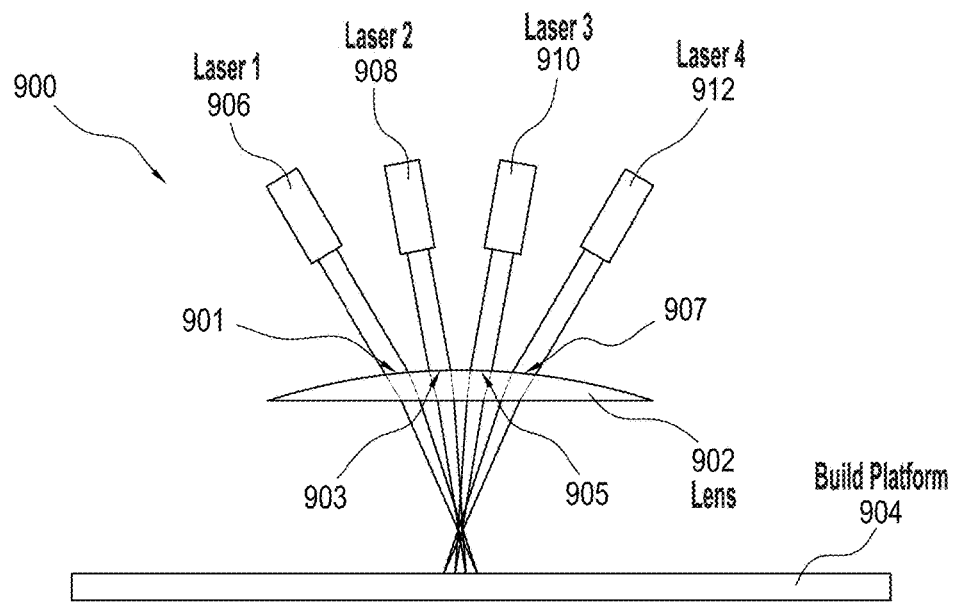
FIG. 8 is a schematic side view of an exemplary embodiment of an optics head of a scanning-based AM device that includes a multiplexing optic.

FIG. 8 illustrates another exemplary embodiment of an optics head 900, which can be used, for example, in a gantry-based scanning AM printer. In this embodiment, the optics head 900 includes a plurality of light sources that impinge upon a multiplexing optic 902 at different, fixed angles without the use of a galvanometer stage. The optics head 900 can be mounted to a gantry carriage, as described above, and can move in conjunction with movement of the gantry carriage. Each light source of the plurality of light sources can be fixedly mounted to the gantry carriage. The multiplexing optic 902 can direct the plurality of light paths to focus each light path of the plurality of light paths to a discrete location on a build platform 904. The illustrated embodiment includes a first light source 906, a second light source 908, a third light source 910, and a fourth light source 912. In such an embodiment, the multiplexing optic 902 can include at least four sub-apertures 901, 903, 905, and 907, each of the at least four sub-apertures serving as a dedicated sub-aperture for one of the four light sources 906, 908, 910, and 912. As discussed above, in some embodiments, the light sources 906, 908, 910, and 912 may be separately provided from the optics head 900 such that the optics head 900 is primarily, or even exclusively, constituted by the multiplexing optic 902.

While four light sources are illustrated, it will be appreciated that a greater or fewer number of light sources (e.g., one, two, three, five, six, etc.) are within the scope of the present disclosure. Additionally, while not shown in the embodiment of FIG. 8, an optical monitoring device can be fixed to the gantry carriage and similarly directed through the multiplexing optic at a fixed angle towards the build platform such that a field of view of the optical monitoring device includes at least a portion of the build platform. In an embodiment without the use of galvanometer(s) to direct optical paths, all motion of an optical path over a build platform can be accomplished by motion of the gantry carriage itself. With a plurality of light sources capable of having an overlapping field of irradiation on a build platform, a build rate can be increased by maintaining several parallel melt tracks. More particularly, each light source of the plurality of light sources can cause a single melt track of irradiated build material. In some embodiments, a light source output can be synchronously modulated with gantry motion to selectively fuse a feedstock build material.

Figure 9:
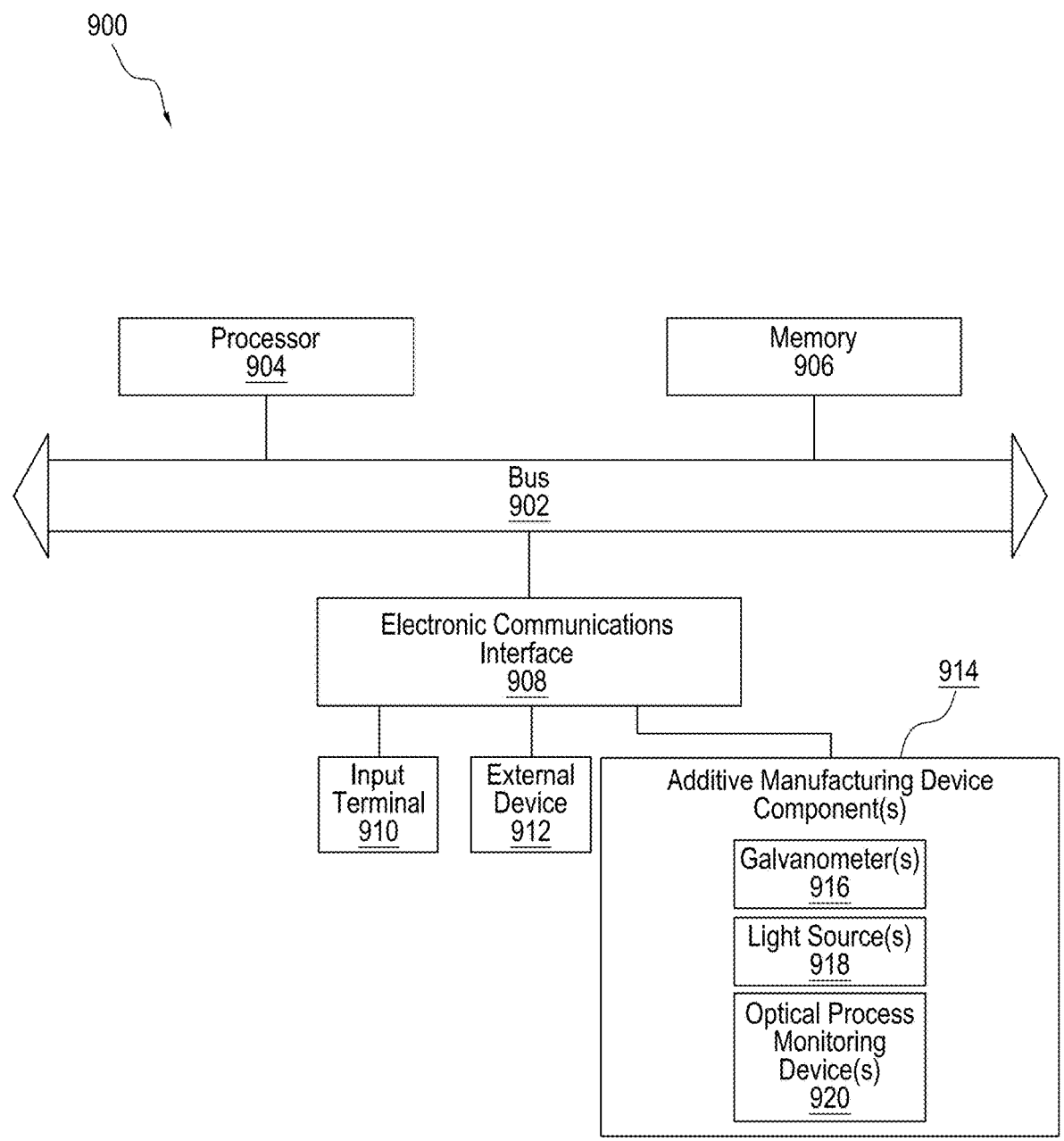
FIG. 9 is a schematic block diagram of an exemplary controller for use with AM devices and methods disclosed herein.

FIG. 9 schematically illustrates an exemplary embodiment of a controller 900 that can be used in conjunction with the systems, methods, and devices disclosed herein. Various aspects of an additive manufacturing device of the present disclosure can be in communication with the controller 900, and the controller can be configured to control the same. The controller 900 can have several elements in electronic communication over a bus 902. In some embodiments, the controller can include a processor 904, a memory 906, and an electronic communications interface 908, all of which can be in communication with each other via the bus 902. Although each of these components are referred to in the singular, it will be appreciated by a person skilled in the art that the various functions described as being carried out by one of the components can actually be carried out by multiple of these components, e.g., the functions described as being carried out by the processor 904 can be carried out by multiple processors.

The electronic communications interface 908 can be in communication with one or more of an input terminal 910, an external computing device 912, and at least one component of an additive manufacturing device 914. The at least one component of the additive manufacturing device can include, for example, one or more galvanometer(s) 916, one or more light source(s) 918, and/or one or more optical process device(s) 920. By way of non-limiting example, the controller can provide electrical current signals to one or more galvanometer(s) 916. The one or more galvanometer(s) 916 can be responsive to electrical current and can thus convert this electrical signal to motion (e.g., rotary motion). The controller 900 can then scan or direct a toolpath of a light source (e.g., a laser) by way of turning one or more mirrors attached to the one or more galvanometer(s). In this manner, the toolpath can be configured to direct a light path of the light source towards a galvanometer for eventual direction to a build platform. By way of further example, one or more optical process monitoring device(s) 920 can be in communication with the controller 900 via the electronic communications interface 908. Transmissions between the one or more optical process monitoring device(s) 920 and the controller 900 can typically be data and other information, such as imaging data, acquired by the optical process monitoring device(s). A person skilled in the art will appreciate that communication to and from the electronic communications interface 908 can be achieved by either wired or wireless communication, and/or by other mechanisms and means known to those skilled in the art for transmitting data, signals, information, etc. (e.g., optical).

The controller 900 can also be connected to one or more external device 912 and one or more input terminal 910 via the electronic communications interface 908. By way of non-limiting example, the external device 912 can be a display, a computing device, and/or a sensor. An input terminal 910 can be configured to allow a user or other system to input data directly into the controller 900. Input data can include a build material composition, a build plan, a desired time-temperature profile, etc. The input terminal 910 can be any known input device, for example, a keyboard and/or a cursor.

The processor 904 can include a microcontroller, a microcomputer, a programmable logic controller (PLC), a field-programmable gate array (FPGA), an application specific integrated circuit (ASIC), integrated circuits generally referred to in the art as a computer, and/or other programmable circuits, and these terms may be used interchangeably herein. The processor 904 can be configured to receive and process data from other elements of the controller 900. The processor can be configured to generate information and/or perform various calculations based on, for example, data received from the electronic communications interface 908 and/or data stored in the memory 906.

The processor 904 can be in communication with the memory 906, which can include one or more of a random-access memory (RAM), a read-only memory (ROM), a flash memory, a non-transitory computer readable storage medium, and so forth. The memory 906 can store instructions for execution by the processor 904 to implement the systems disclosed herein and/or to execute the methods disclosed herein. Additionally, or alternatively, the memory 906 can store information calculated by the processor 904 and/or received from an input terminal, an external device, and/or one or more components of an AM device through the communications interface 908.

In some embodiments, the processor 904 can embody a toolpath generator, as will be explained in detail below, to generate a desired toolpath for one or more components of an AM device. For example, the toolpath generator can receive data input in an input terminal or received from an external device by way of the electronic communications interface 908. Additionally, or alternatively, the toolpath generator can receive data directly from a component of the AM device. The processor 904 can then calculate a desired toolpath, generate control signals for one or more galvanometer(s) (or other components associated with delivery of light to a desired location) to achieve the desired toolpath, and send the control signals to the one or more galvanometer(s) via the electronic communications interface 908. Additionally, or alternatively, the processor 904 can send the desired toolpath calculations and/or generated control signals to the memory 906 for storage.

Distortion Aware Toolpath Planning with Multiplexing Optic(S)

Lens distortion is a feature of practical lens designs. Accordingly, a mapping from an optical path input angle to a lens to a spot location on a build platform to which the lens focuses the optical path does not typically follow a paraxial approximation for a distance of a focus point from an optical axis of the lens. The paraxial approximation for the distance, d, of the focus from an optical axis of a lens is $d=f \tan(\theta)$, where $\theta$ is an angle between the optical axis and incident light and f is the focal ratio. In some instances, lens distortion may be intentionally induced to impart a substantially $d \approx f\theta$ character to simplify laser delivery. Such compensation, however, will be imperfect.

Accordingly, a toolpath generator of the present disclosure can be used as an improved tool for build file generation (i.e., toolpath planning) for use with an AM printer including a multiplexing optic. For a known multiplexing optic design, a mapping from an input angle of an optic path through the multiplexing optic to a spot location on a build platform can be calculated, for example by hand and/or by optical CAD software and encoded. By way of non-limiting example, the encoding can include building and/or augmenting an optical model, an optical model black box, an analytical mathematical expression, a mathematical expansion, and/or a look-up table. Galvanometer commands can then be generated by inverting the mapping for the given multiplexing optic to achieve a desired toolpath property. For example, a toolpath can be generated to maintain a desired toolpath speed, a desired toolpath location, and/or a desired thermal profile, among other properties, across a component being manufactured. Accordingly, a desired toolpath can be generated despite any non-proportional characteristics of laser delivery optics. The toolpath generation algorithm can further include an optimization algorithm used to obtain at a desirable position-time-temperature profile, a component residual stress profile, a component feature size, and/or a build rate, among other properties. Optionally, the toolpath generation algorithm can select which laser(s), if using a plurality of lasers, to irradiate a given location or portion of a build platform to achieve a desired laser spot size.

Method of Using an AM Printer with a Multiplexing Optic

Figure 10:
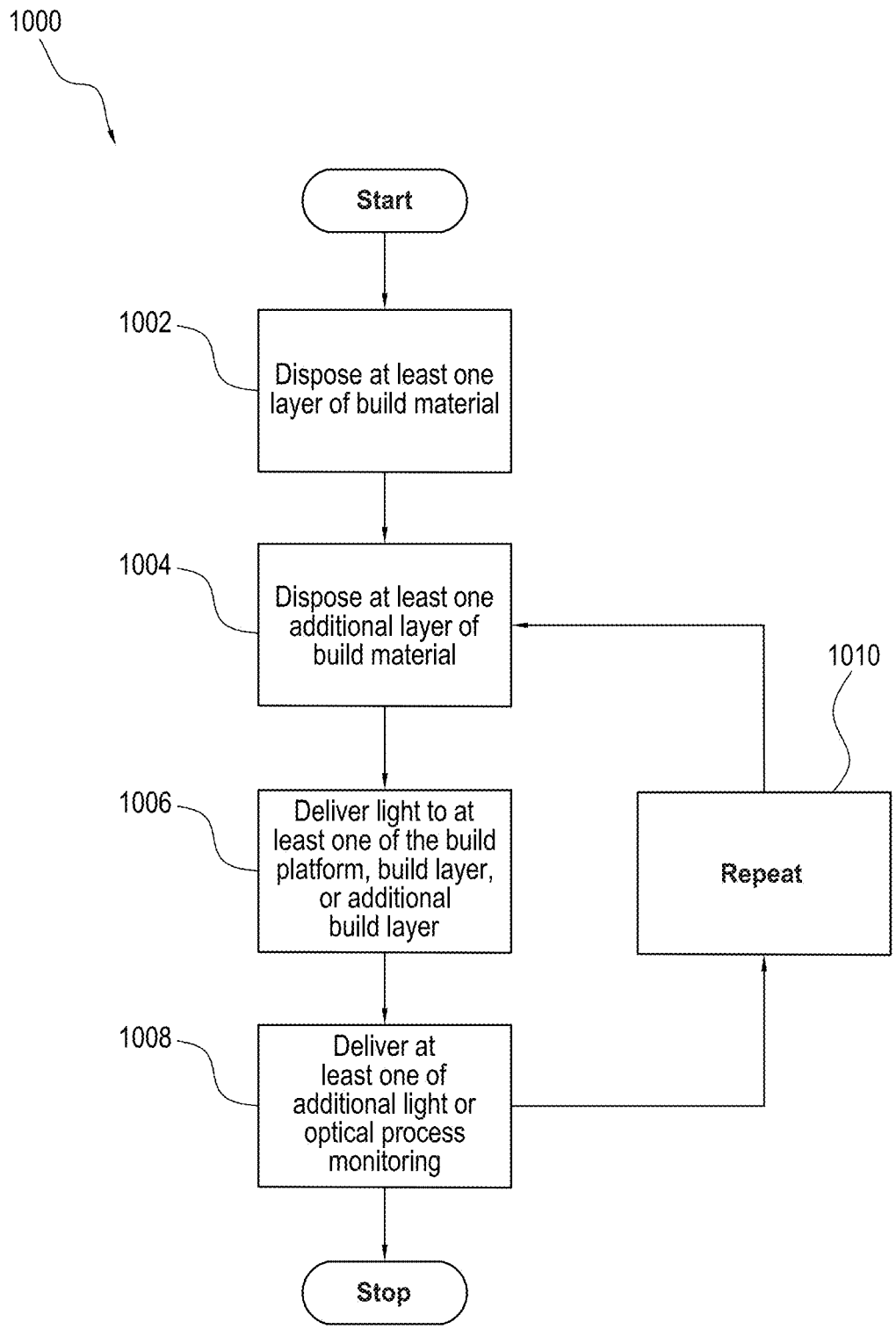
FIG. 10 is a flowchart illustrating an exemplary method of manufacturing a three-dimensional component using an AM device having a multiplexing optic.

FIG. 10 shows an exemplary method 1000 for manufacturing a three-dimensional object using an AM printer that includes a multiplexing optic. The AM printer can be, for example, an SLM printer having a multiplexing optic. The exemplary method 1000 can be used with any embodiments or combination of embodiments of the present disclosure disclosed herein or otherwise derivable from the present disclosures. For example, a multiplexing optic can be a lens-based multiplexing optic with a plurality of lens elements. Alternatively, a multiplexing optic can include both lens and mirror elements. Finally, a multiplexing optic can be a mirror-based multiplexing optic.

The method can begin by disposing a layer of build material onto a build platform of an AM printer (1002). At least one additional layer of build material can be disposed on the build platform and/or at least one layer of build material already disposed on the build platform (step 1004). In some embodiments, disposing a layer of build material can include using a recoater of the AM printer to deposit and/or spread a layer of the build material from a build supply well onto the build platform and/or a previous build material layer. It will be appreciated that a layer of build material need not cover an entire surface of a build platform or a previous layer of build material. Further, disposing the at least one layer of build material and/or the at least one additional layer of build material can include depositing the build material and/or fusing the build material. By way of non-limiting example, a build material can include at least one of a metal, a metal alloy powder, a polymer powder, or a resin. In some embodiments, the action(s) of disposing the build material(s) (i.e., steps 1002 and/or 1004) can be based on a build plan of a component to be manufactured by the AM printer.

At step 1006, light can be delivered to the build platform, the at least one layer on the build platform, and/or the at least one additional layer. The delivery of light can be from a light source, such as a laser, light emitting diode, a super luminescent light emitting diode, and/or an incandescent bulb. Accordingly, in some embodiments, delivering the light can include operating a laser, and/or other light source(s), to deliver the light. In some embodiments, delivering light to at least one of the build platform, a layer on the build platform, and/or the at least one additional layer can be directed by at least one galvanometer and/or a controller associated with such galvanometer(s). At step 1008, the method can include delivering at least one of additional light or optical process monitoring to the build platform, the at least one layer on the build platform, and/or the at least one additional layer. In embodiments in which an AM printer includes a gantry carriage, the method can further include moving the gantry carriage to move and position the multiplexing optic(s) and light source(s) relative to the build platform. More particularly, the multiplexing optic(s) and light source(s) can be fixed relative to the gantry such that the multiplexing optic(s) and light source(s) move with the gantry carriage as the gantry moves relative to the build platform. In some embodiments, the action(s) of delivering light (i.e., steps 1006 and/or 1008) can be based on a build plan of a component to be manufactured by the AM printer.

Delivering optical process monitoring can include directing and delivering an optical process monitoring path of an optical process monitoring device to a region of the build platform, up to the entire build platform. In some embodiments, delivering optical process monitoring can include delivering the optical process monitoring path through the multiplexing optic such that a field of view of an optical process monitoring device covers or substantially covers a portion of the build platform to which light is delivered. In other words, the field of view of the optical process monitoring can be directed by the multiplexing optic to coincide with a portion of the build material irradiated by light. In some embodiments, delivering optical process monitoring can include using a galvanometer(s) to direct the optical process monitoring path to the multiplexing optic(s), and, more particularly, to one or more dedicated sub-apertures of the multiplexing optic(s).

In some embodiments, delivering light (step 1006) and delivering at least one of additional light or optical process monitoring (step 1008) can occur simultaneously, or near simultaneously, for at least a portion of the delivering light and delivering at least one of additional light or optical process monitoring. In other embodiments, delivering light and delivering at least one of additional light or optical process monitoring can occur sequentially.

In some embodiments, the actions of delivering light and delivering at least one additional light, if delivery of the at least one additional light occurs, can irradiate the at least one layer and/or the at least one additional layer of build material, or portions thereof. It will be appreciated that a step of irradiating the at least one layer of build material can occur prior to depositing an additional layer of build material. For example, after disposing the at least one layer of build material (step 1002) the at least one layer of build material can be irradiated by delivering light to the at least one layer of build material prior to disposing the at least one additional layer of build material (step 1004). A person skilled in the art will understand that an order of actions can vary. Thus, while often the order of actions may include depositing and irradiating in a cyclical manner (e.g., depositing a layer, irradiating a layer, depositing a layer, irradiating a layer, etc.), other orders are possible, as evidenced by the present disclosure. The present disclosure certainly allows for the aforementioned cyclical approach. In some embodiments, a plurality of light sources can be used for delivering the light and delivering the at least one additional light, if delivery of the at least one additional light occurs. The plurality of light sources can be operated at at least two different wavelengths. By way of non-limiting example, operating wavelengths can be selected, at least in part, based on a chemistry of the build material to achieve a desired locally varying elastic modulus, a desired fracture toughness, and/or a desired chemical resistance in a manufactured three-dimensional component. Alternatively, or additionally, in some embodiments operating wavelengths can be selected, at least in part, based on an absorbance of the build material. In some embodiments, light or additional light can be delivered from at least one of the plurality of light sources directed by the galvanometer(s). In other embodiments, the plurality of light sources can be directed through the multiplexing optic at fixed angles.

At least one of delivering light and delivering at least one of additional light or optical process monitoring can occur by dividing a theoretical input aperture of a multiplexing optic into a plurality of sub-apertures. More particularly, in some embodiments, each of delivering light and at least one of delivering additional light or optical process monitoring can include passing an optical path, or a plurality of optical paths, from at least one light source through a dedicated sub-aperture of the plurality of sub-apertures of the multiplexing optic. Further, at least one of delivering light and delivering at least one of additional light or optical process monitoring can occur along a substantially common optical axis.

As discussed above, a multiplexing optic can be configured such that a particular sub-aperture of the plurality of sub-apertures can function as a dedicated sub-aperture for a particular light source or a particular optical process monitoring device. Accordingly, delivering light and delivering at least one of additional light or optical process monitoring can include passing a light path through a dedicated sub-aperture of the multiplexing optic, with the multiplexing optic directing the light path to a desired location on one of the build platform, the layer of build material on the build platform, or the at least one additional layer of build material. Delivering at least one of an additional light or optical process monitoring can include directing at least one of an additional light path from a light source or an optical process monitoring path from an optical process monitoring device through a particular dedicated sub-aperture of the multiplexing optic, with the multiplexing optic directing the path to a particular point on one of the build platform, the layer of build material on the build platform, or the at least one additional layer of build material. It will be appreciated that it is within the scope of the present disclosure to deliver additional light paths and/or additional optical process monitoring paths to the build platform, the layer of build material on the build platform, and/or the at least one additional layer of build material. In such instances, each additional light path, or additional plurality of light paths from an additional light source, and/or optical process monitoring path, or a plurality of optical process monitoring paths from an optical process monitoring device, can pass through a dedicated sub-aperture of the multiplexing optic and be directed to a point on one of the build platform, the layer of build material on the build platform, or the at least one additional layer. In some instances, one or more sub-apertures of an optic can overlap on an aperture of the optic. A single light source, or a single optical monitoring device, may emit a plurality of optical paths, with each of the plurality of optical paths configured to pass through a dedicated sub-aperture of a multiplexing optic. Accordingly, when discussing "an optical path" enters a sub-aperture, this can refer to a single optical path, or a plurality of optical paths, from a single optic (e.g., light source, optical monitoring device).

Optionally, at least one of delivering the light and/or delivering the additional light can include passing the light or the additional light through an additional optic to reduce and/or eliminate chromatic aberrations. In other words, at least one additional optic can be placed along an individual light path between the multiplexing optic and a light source such that delivering light from the light source includes passing the light through the at least one additional optic and the multiplexing optic. Additionally, or alternatively, reducing chromatic aberrations can be achieved by delivering the light or the additional light using a multiplexing mirror optic and/or a mirror-element of a multiplexing optic. In some embodiments, at least one of delivering the light or delivering at least one of additional light or optical process monitoring can include delivering an optical path to a build platform and/or material associated with the build platform using a plurality of multiplexing optics. In such embodiments, each multiplexing optic of the plurality of multiplexing optics can have an independent optical axis with respect to an optical axis of at least one other multiplexing optic of the plurality of multiplexing optic(s).

As discussed above, various actions performed during the manufacturing of a three-dimensional component in conjunction with the present disclosures can be performed in accordance with a desired toolpath and/or build plan. In some instances, a method of AM can include generating a toolpath and controlling a tool of the AM printer in accordance with the generated toolpath. More particularly, in some embodiments, a toolpath generation algorithm can generate a toolpath based, at least in part, on a simulated angle position mapping and/or a measured angle position mapping. The simulated angle position mapping can be an estimated angle of incidence of one or more optical paths that pass through a multiplexing optic to their focal point on a build platform. Additionally, or alternatively, the toolpath generation algorithm can generate a toolpath based on a measured angle of incidence of the one or more optical paths that pass through a multiplexing optic to their focal point on the build platform. Operating the toolpath generation algorithm can include an optimization algorithm configured to obtain at least one of a desired position-time-temperature profile, a desired manufactured three-dimensional object residual stress profile, a desired manufactured three-dimensional object feature size, or a desired build rate. Accordingly, the method can further include positioning a tool, for example a galvanometer and/or a light source, of or otherwise associated with an AM printer based on the generated toolpath.

Following the delivery of at least one of additional light or optical process monitoring (step 1008), the method can repeat a number of the steps one or more times until a three-dimensional component, or desired portion of a three-dimensional component, is complete. More specifically, following step 1008, the build platform can be moved (e.g., recessed, although other movements in any of six directions is possible), and the method can return to step 1004, at which at least one additional layer of build material can be disposed on the build platform, the at least one layer disposed on the build platform, and/or the at least one additional layer of build material, and the additive manufacturing method 1000 can proceed until a desired three-dimensional component, or portion of the component, is complete. At the point when the component or portion of the component is complete, the three-dimensional component can be removed from the additive manufacturing device for post-processing or inspection. Additionally, or alternatively, a post-processing and/or inspection can occur while the completed component, or portion of the component, remains within, or otherwise associated with, the AM printer. By way of non-limiting example, post-processing and/or inspection can include scanning and/or testing the three-dimensional component, removing the part from the additive manufacturing device, further treating the part, etc. In some embodiments the method need not repeat following the delivering of at least one of additional light or optical process monitoring (step 1008) and can proceed directly to a stop for further processing, inspection, and/or removal of the three-dimensional printed part.

Experimental Results of an SLM Printer

Figure 11:
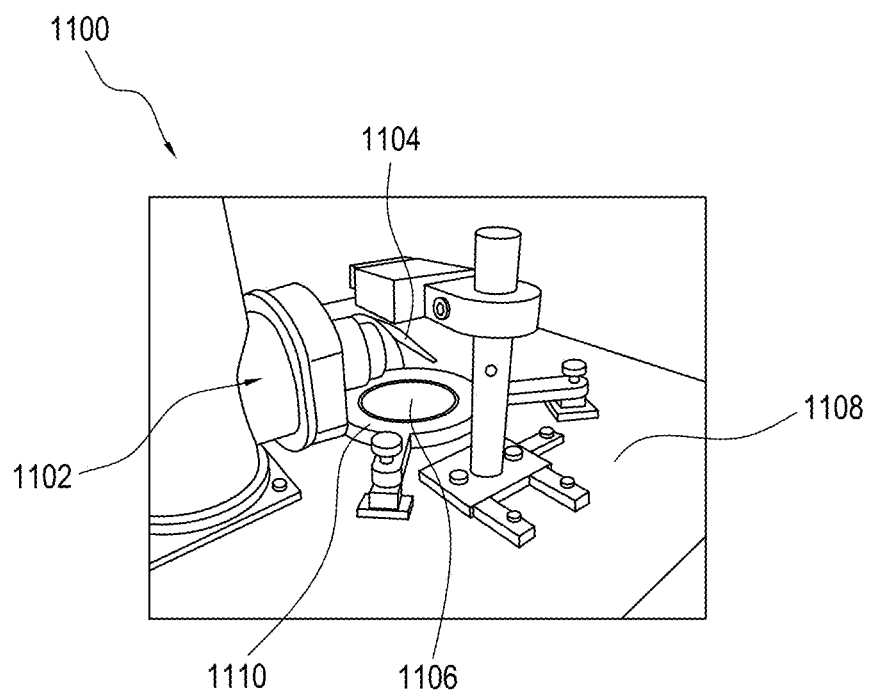
FIG. 11 is a perspective view of an experimental set-up that includes a multiplexing optic for optical process monitoring and light delivery.
Figure 12:
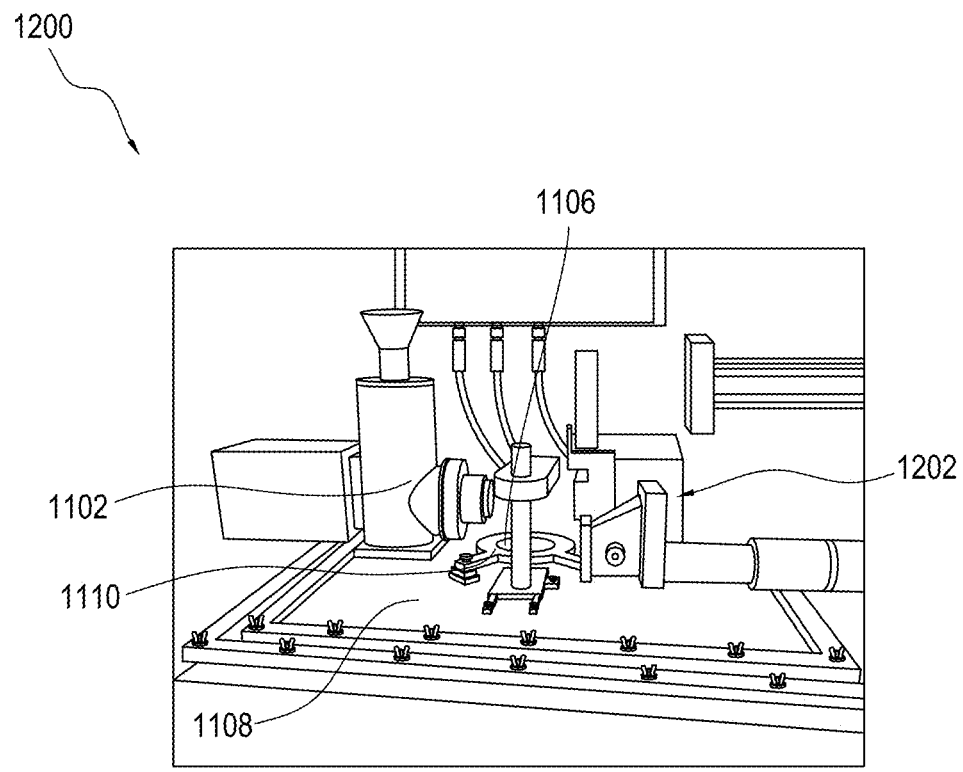
FIG. 12 is an alternative perspective view of the experimental set-up of FIG. 11, illustrating light source equipment in place.

FIGS. 11 and 12 illustrate an exemplary set-up of an SLM AM printer with a multiplexing optic and an optical monitoring device. FIG. 11 shows an exemplary set-up 1100 of an optical process monitoring device for observing a single laser SLM three-dimensional print process using a multiplexing optic, as described above. An optical process monitoring device 1102 can be, for example, a camera. More particularly, the optical process monitoring device 1102 can be a Midwave Infrared (MWIR) camera. An optical process monitoring path of the camera 1102 can be directed by a galvanometer 1104, or other control device, such as a controller described herein or otherwise known to those skilled in the art. In some embodiments the galvanometer 1104 can be a turning mirror or prism mounted on a 6-axis kinematic fixture. The optical process monitoring path (i.e., a viewing axis of the camera 1102) can be directed by the galvanometer 1104 through a multiplexing optic 1106 to focus on a build platform 1108. In the illustrated embodiment, the multiplexing optic 1106 can be a 100 mm zinc selenide lens placed within a fixture 1110. The multiplexing optic 1106 can focus both a light source and serve as an objective lens for the optical process monitoring device 1102. The set-up 1100 can be placed above a build platform 1108 of an SLM printer.

FIG. 12 shows the optical monitoring set-up 1100 of FIG. 11 in conjunction with an SLM printer having a light source (i.e., laser) delivery system 1202. The light source delivery system 1202 can include a laser, a collimator, and/or a galvanometer for directing a light path from the laser through the multiplexing optic to the build platform (each of which are not visible in FIG. 12 due to the housing of the light source delivery system 1202). Due to a limited footprint of the multiplexing optic 1106, an optical process monitoring path from the camera 1102 and a light path of the laser system 1202 can be delivered off-axis with respect to an optical axis of the multiplexing optic 1106. The multiplexing optic 1106 can multiplex the optical process monitoring path of the camera 1102 and the light path of the laser system 1202 onto the build platform 1108. As discussed above, the multiplexing optic can include a plurality of sub-apertures, with each of the plurality of sub-apertures configured to independently receive and direct a light path and/or an optical process monitoring path to the build platform.

Figure 13:
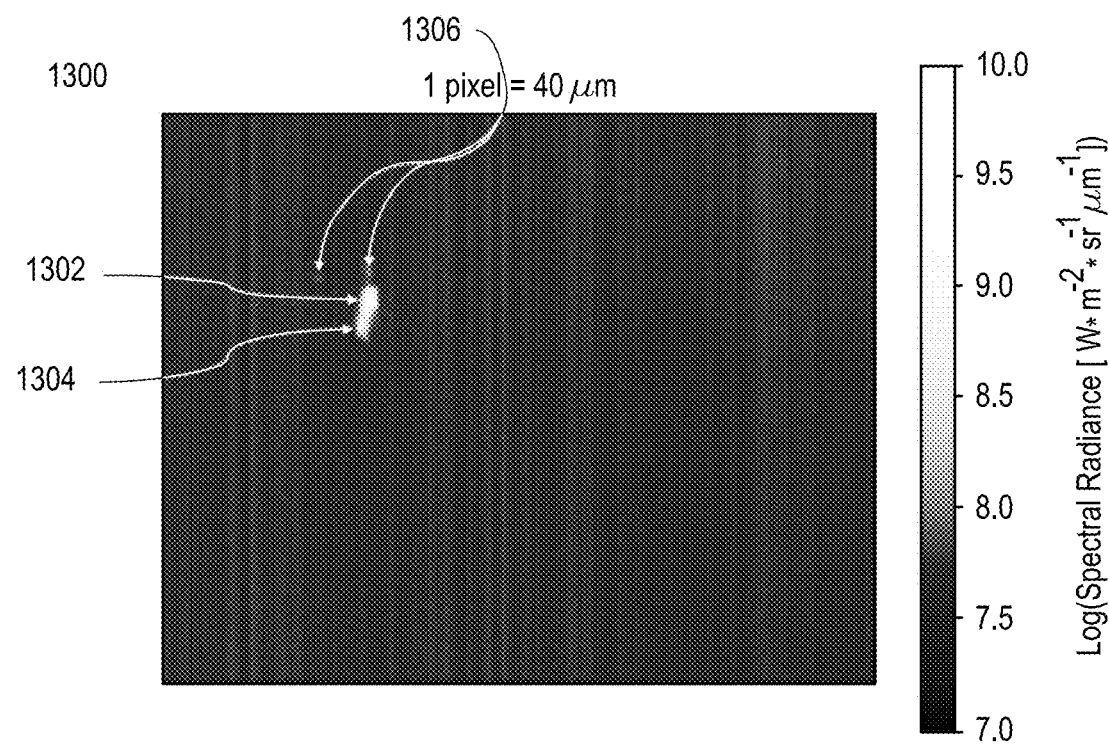
FIG. 13 is an image illustrating stable SLM processing using the experimental set-up of FIG. 12.
Figure 14:
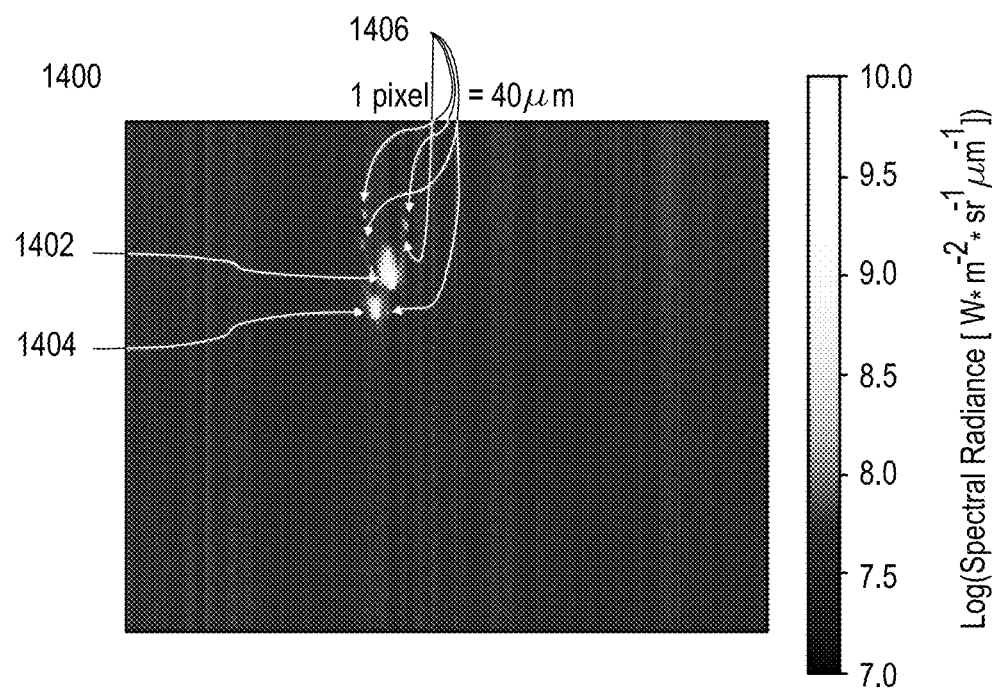
FIG. 14 is an image illustrating unstable SLM processing using the experimental set-up of FIG. 12.

FIGS. 13 and 14 each depict representative images captured by the camera 1102 during an experiment using the set-up 1200 as described above with respect to FIG. 12. Each image shows spectral radiance of a portion of the build platform 1108, and, more particularly, a portion of the build platform 1108 corresponding to a location to which a laser path from the laser system 1202 is directed, thereby irradiating a build material present on the build platform. A capture 1300 of FIG. 13 illustrates a stable SLM processing. As can be seen there is a focused point 1302 with elevated spectral radiation representing the point to which the laser has been directed and focused by the multiplexing optic 1106. A small surrounding area 1304 forms a trail of spectral radiation from the focused point 1302, corresponding to previously molten material. Minimal spatter 1306, i.e., molten material ejected from the melt pool, is visible. In contrast, FIG. 14 depicts a capture 1400 of an unstable SLM process. More particularly, the capture 1400 shows a region 1402 representing a point to which a laser has been directed and focused by a multiplexing optic, and a region 1404 that shows overheating and balling characteristic of a molten tail broken into discrete droplets. Moreover, there is substantially increased spatter 1406 from the melt pool 1402. Accordingly, the capture 1400 corresponds to a defect in the SLM printing process. In this manner, improved optical access to the build platform for optical process monitoring can result in reliable detection and imaging of an SLM AM process.

ADM Optic Application to Various AM Processes

While the above disclosure has focused on implementation of optical aperture division multiplexing in the context of SLM, the multiplexing optic technique is more broadly applicable to other classes of AM. For example, selective laser sintering (SLS) machines feature laser beam steering and focusing methods that are practically identical to their SLM counterpart. Accordingly, multiplexing optic systems, methods, and devices disclosed herein are directly transferable to SLS processes.

Stereolithography (SLA) also relies on focused light, in this case, to selectively induce photo-polymerization of a resin to fabricate plastic components. Light from a sufficiently bright source (e.g., incandescent bulb, light emitting diode, laser, etc.) can be directed via galvanometers through an f–θ optic and/or directed through a converging lens placed upstream of the galvanometer to cause the light to focus. Either lens location would be suitable to replace the on-axis optics with a multiplexing optic variant, as described above, to enable increased light power, parallel processing, or process monitoring. Additional benefit in the SLA application includes the ability to photo-polymerize using lasers of differing wavelengths. Specifically, resin chemistry may be engineered to impart locally varying mechanical properties (e.g., elastic modulus, fracture toughness, chemical resistance, etc.) based on wavelengths and intensities used to drive the polymerization reaction.

One skilled in the art will appreciate further features and advantages of the disclosure based on the above-described embodiments. Accordingly, the disclosure is not to be limited by what has been particularly shown and described, except as indicated by the appended claims.

What is claimed is:

1. A method for manufacturing a three-dimensional object, the method comprising:
    disposing at least one layer of a build material on a build surface;
    disposing at least one additional layer of a build material on at least one of the build surface or the at least one layer disposed on the build surface;
    delivering light to at least one of the build surface, the at least one layer on the build surface, or the at least one additional layer by causing the light to pass through a first sub-aperture of a multiplexing optic, the first sub-aperture causing the light to be directed towards a first location on the build surface; and
    delivering optical process monitoring to at least one of the build surface, the at least one layer on the build surface, or the at least one additional layer by causing the optical process monitoring to pass through a second sub-aperture of the multiplexing optic, the second sub-aperture being distinct from or partly overlapping with the first sub-aperture, and the second sub-aperture causing the optical process monitoring to provide an optical process monitoring field of view that encompasses the light directed by the first sub-aperture towards the first location on the build surface,
    wherein an optical axis of the first sub-aperture is substantially common with an optical axis of the second sub-aperture, and
    wherein the first and second sub-apertures are defined in a single optical element of the multiplexing optic.

2. The method of claim 1, wherein the delivering the light further comprises fusing at least a portion of the at least one layer of the build material on the build surface or fusing at least a portion of the at least one additional layer of the build material on the build surface or on the at least one layer.

3. The method of claim 1, wherein the first and second sub-apertures are defined in one of a lens or mirror element of a reflective, diffractive, aspherical, or freeform character, the method further comprising operating the one of a lens or mirror element to give the first and second sub-apertures at least one different focal property than the other of the first and second sub-apertures.

4. The method of claim 1, wherein the multiplexing optic comprises a plurality of multiplexing optics, the plurality of multiplexing optics having independent optical axes, and at least one of delivering the light or the optical process monitoring occurs by causing the at least one of the light or the optical processing monitoring to pass through one or more sub-apertures formed in one or more additional multiplexing optics of the plurality of multiplexing optics.

5. The method of claim 1, further comprising placing one or more additional optics along an individual light path between the multiplexing optic and at least one of a light source generating the light or an optical monitoring system performing the optical process monitoring.

6. The method of claim 1, wherein the delivering the light comprises delivering the light via a plurality of light sources.

7. The method of claim 1, further comprising operating a toolpath generation algorithm configured to maintain at least one of a desirable toolpath speed or a desirable toolpath in view of at least one of a simulated angle-position mapping for at least one of the delivered light or the delivered optical process monitoring that pass through the multiplexing optic, or a measured angle-position mapping for at least one of the delivered light or the delivered optical process monitoring that pass through the multiplexing optic.

8. The method of claim 1,
wherein the delivered light initiates from a location on the multiplexing optic different than a location from which the optical process monitoring initiates, and
wherein the delivered light crosses into the optical process monitoring field of view at a location below the multiplexing optic and above the build surface.

9. The method of claim 1, further comprising:
delivering at least one additional light to at least one of the build surface, the at least one layer on the build surface, or the at least one additional layer by causing the at least one additional light to pass through a third sub-aperture of the multiplexing optic, the third sub-aperture being a different sub-aperture than each of the first sub-aperture and the second sub-aperture, the third sub-aperture causing the at least one additional light to be directed towards a second location on the build surface, and the second location being a different location than the first location,
wherein an optical axis of the third sub-aperture is substantially common with the optical axis of each of the first and second sub-apertures.

10. The method of claim 1, wherein a centroid of the second sub-aperture is disposed outside of the perimeter of the first sub-aperture.

11. The method of claim 1, wherein the second sub-aperture is distinct from the first sub-aperture.

12. The method of claim 1, wherein the second sub-aperture is partly overlapping with the first sub-aperture.

13. A system for manufacturing a three-dimensional object, the system comprising:
an additive manufacturing printer configured to manufacture a three dimensional object according to a build plan by at least one of fusing or depositing a plurality of layers of build material on a build surface, the additive manufacturing printer comprising a light source and optical process monitoring instrumentation; and
a multiplexing optic having a plurality of sub-apertures formed therein, the multiplexing optic being configured to deliver light from the light source, via a first sub-aperture of the plurality of sub-apertures, to at least one of a layer of the plurality of layers of build material or the build surface by the first sub-aperture causing the light to be directed towards a first location on the build surface, and the multiplexing optic being further configured to deliver optical process monitoring, via a second sub-aperture of the plurality of sub-apertures, to at least one layer of the plurality of layers of build material or the build surface by the second sub-aperture causing the optical process monitoring to provide an optical process monitoring field of view that encompasses the light directed by the first sub-aperture towards the first location on the build surface, an optical axis of the first sub-aperture being substantially common with an optical axis of the second sub-aperture, the second sub-aperture being distinct from or partly overlapping with the first sub-aperture, and the first and second sub-apertures being defined in a single optical element of the multiplexing optic.

14. The system of claim 13, wherein the optical process instrumentation has a field of vision that substantially overlaps a region of at least one layer of the plurality of layers of build material configured to be actively irradiated with the light source.

15. The system of claim 13, wherein the multiplexing optic comprises at least one lens or mirror element that affects only a subset of sub-apertures of the plurality of sub-apertures.

16. The system of claim 13, wherein the first and second sub-apertures are defined in one of a lens or mirror element of a reflective, diffractive, aspherical, or freeform character, the one of a lens or mirror element configured to give the first and second sub-apertures a different focal property than another of the plurality of sub-apertures.

17. The system of claim 13, further comprising at least one additional multiplexing optic, the at least one additional multiplexing optic having an optical axis that is independent with respect to an optical axis of any other multiplexing optic of the system.

18. The system of claim 13, wherein at least one additional optic is placed along an individual light path that extends between the multiplexing optic and at least one of the light source or the optical monitoring instrumentation.

19. The system of claim 13,
wherein the light source is one of a plurality of light sources, and
wherein at least one light source of the plurality of light sources is directed through the multiplexing optic at a fixed angle.

20. The system of claim 13, further comprising a toolpath generator configured to generate a toolpath for maintaining at least one of a desirable toolpath speed or a desirable toolpath, in view of at least one of simulated angle-position mapping or measured angle-position mapping for at least one of the delivered light or the delivered optical process monitoring that pass through the multiplexing optic.

21. The method of claim 13, wherein a centroid of the second sub-aperture is disposed outside of the perimeter of the first sub-aperture.

22. The method of claim 13, wherein the second sub-aperture is distinct from the first sub-aperture.

23. The method of claim 13, wherein the second sub-aperture is partly overlapping with the first sub-aperture.

24. A method for manufacturing a three-dimensional object, the method comprising:

disposing at least one layer of a build material on a build surface;

disposing at least one additional layer of a build material on at least one of the build surface or the at least one layer disposed on the build surface;

delivering a first light from a first light source to at least one of the build surface, the at least one layer on the build surface, or the at least one additional layer by causing the first light to pass through a first sub-aperture of a multiplexing optic, the first sub-aperture causing the first light to be directed along a first optical path towards a first location on the build surface that is within a first field of view of the first sub-aperture; and delivering a second light from a second light source, the second light source being a different light source than the first light source, to at least one of the build surface, the at least one layer on the build surface, or the at least one additional layer by causing the second light to pass through a second sub-aperture of a multiplexing optic distinct from or partly overlapping with the first sub-aperture, the first and second sub-apertures being defined in a single optical element of the multiplexing optic, the second sub-aperture causing the second light to be directed along a second optical path towards a second location on the build surface that is within a second field of view of the second sub-aperture, the first location also being within the second field of view of the second sub-aperture and the second location also being within the first field of view of the first sub-aperture, the first and second optical paths being different optical paths, and the first and second locations being different locations on the build surface, wherein a first centroid of a first optical footprint from which the first optical path extends from the first sub-aperture is at a different location of the multiplexing optic than a second centroid of a second optical footprint from which the second optical path extends from the second sub-aperture.

25. The method of claim 24, wherein the both the first and second optical paths are off-axis with respect to a common axis of the multiplexing optic.

26. The method of claim 24, wherein one of the first and second optical paths is off-axis and the other of the first and second optical paths is on-axis with respect to a common axis of the multiplexing optic.

27. The method of claim 24, wherein a centroid of the second sub-aperture is disposed outside of the perimeter of the first sub-aperture.

28. The method of claim 24, wherein the second sub-aperture is distinct from the first sub-aperture.

29. The method of claim 24, wherein the second sub-aperture is partly overlapping with the first sub-aperture.

* * * * *